(12) United States Patent
Yi et al.

(10) Patent No.: US 10,721,036 B2
(45) Date of Patent: Jul. 21, 2020

(54) METHOD AND APPARATUS FOR CONFIGURING FRAME STRUCTURE FOR NEW RADIO ACCESS TECHNOLOGY IN WIRELESS COMMUNICATION SYSTEM

(71) Applicant: LG ELECTRONICS INC., Seoul (KR)

(72) Inventors: Yunjung Yi, Seoul (KR); Kijun Kim, Seoul (KR); Hanbyul Seo, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 2 days.

(21) Appl. No.: 16/089,312

(22) PCT Filed: Mar. 29, 2017

(86) PCT No.: PCT/KR2017/003414
§ 371 (c)(1),
(2) Date: Sep. 27, 2018

(87) PCT Pub. No.: WO2017/171398
PCT Pub. Date: Oct. 5, 2017

(65) Prior Publication Data
US 2019/0116007 A1    Apr. 18, 2019

Related U.S. Application Data

(60) Provisional application No. 62/314,462, filed on Mar. 29, 2016, provisional application No. 62/316,576, (Continued)

(51) Int. Cl.
*H04L 5/00* (2006.01)
*H04W 56/00* (2009.01)
(Continued)

(52) U.S. Cl.
CPC .......... *H04L 5/003* (2013.01); *H04L 27/2607* (2013.01); *H04W 4/42* (2018.02);
(Continued)

(58) Field of Classification Search
None
See application file for complete search history.

(56) References Cited

U.S. PATENT DOCUMENTS

2008/0080476 A1    4/2008  Cho et al.
2013/0148564 A1    6/2013  Yu et al.
(Continued)

OTHER PUBLICATIONS

PCT International Application No. PCT/KR2017/003414, International Search Report dated Jun. 26, 2017, 2 pages.
Etri, "Overview on frame structure and downlink design for TTI shortening", 3GPP TSG RAN WG1 Meeting #84, R1-161011, Feb. 2016, 9 pages.
(Continued)

*Primary Examiner* — Christine T Duong
(74) *Attorney, Agent, or Firm* — Lee, Hong, Degerman, Kang & Waimey

(57) ABSTRACT

A frame structure for a new radio access technology (RAT) is configured by a network node. The network node configures a first frame which has one legacy transmission time interval (TTI) and a second frame which has multiple short TTIs, and communicates with a user equipment (UE) by using at least one of the first frame and the second frame. The UE may be a one of a massive machine-type communication (mMTC) UE, an ultra-reliable and low latency communication (URLLC) UE or an enhanced vehicle-to-everything (eV2X) UE.

12 Claims, 21 Drawing Sheets

Related U.S. Application Data filed on Apr. 1, 2016, provisional application No. 62/316,667, filed on Apr. 1, 2016, provisional application No. 62/330,861, filed on May 3, 2016.

(51) Int. Cl.

| | | |
|---|---|---|
| *H04W 4/42* | (2018.01) | |
| *H04W 4/70* | (2018.01) | |
| *H04L 27/26* | (2006.01) | |
| *H04W 72/04* | (2009.01) | |

(52) U.S. Cl.
CPC ............ *H04W 4/70* (2018.02); *H04W 56/00* (2013.01); *H04W 56/001* (2013.01); *H04W 72/0406* (2013.01); *H04W 72/0446* (2013.01); *H04W 72/0453* (2013.01); *H04L 5/0007* (2013.01)

(56) References Cited

U.S. PATENT DOCUMENTS

| | | |
|---|---|---|
| 2014/0198772 A1 | 7/2014 | Baldemair et al. |
| 2015/0282178 A1 | 10/2015 | Kim et al. |
| 2017/0181182 A1* | 6/2017 | Patel ................. H04W 72/1231 |
| 2017/0238301 A1* | 8/2017 | Nakazawa ............... H04J 11/00 370/329 |
| 2017/0290008 A1* | 10/2017 | Tooher .................. H04L 1/0007 |
| 2017/0367058 A1* | 12/2017 | Pelletier ............ H04W 56/0045 |
| 2018/0192420 A1* | 7/2018 | Hao .................. H04W 72/0446 |

OTHER PUBLICATIONS

Petar Popovski, et al., "Deliverable D6.3 Intermediate system evaluation results," ICT-317669-METIS/D6.3, Mobile and wireless communications Enablers for the Twenty-twenty Information Society, Aug. 2014, 132 pages.

\* cited by examiner

METHOD AND APPARATUS FOR CONFIGURING FRAME STRUCTURE FOR NEW RADIO ACCESS TECHNOLOGY IN WIRELESS COMMUNICATION SYSTEM

CROSS-REFERENCE TO RELATED APPLICATIONS

This application is the National Stage filing under 35 U.S.C. 371 of International Application No. PCT/KR2017/003414, filed on Mar. 29, 2017, which claims the benefit of U.S. Provisional Application No. 62/314,462, filed on Mar. 29, 2016, 62/316,576, filed on Apr. 1, 2016, 62/316,667, filed on Apr. 1, 2016, and 62/330,861, filed on May 3, 2016, the contents of which are all hereby incorporated by reference herein in their entireties.

BACKGROUND OF THE INVENTION

Field of the Invention

The present invention relates to wireless communications, and more particularly, to a method and apparatus for configuring a frame structure for a new ratio access technology (RAT) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (URLLC) is discussed. This new technology may be called new radio access technology (RAT) for convenience.

In the new RAT, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating new RAT efficiently, various schemes have been discussed. Specifically, in perspective of using frequency/spectrum, some new features may need to be required. Further, new frame structure may also need to be required.

SUMMARY OF THE INVENTION

The present provides a method and apparatus for configuring a frame structure for a new ratio access technology (RAT) in a wireless communication system. The present invention discusses initial access procedure which can allow different use cases supported in the same spectrum, e.g. massive machine-type communication (mMTC) and enhanced mobile broadband (eMBB), for both below and above 6 GHz. The present invention discusses how to support multi/variable transmission time interval (TTI) operation for each channel including hybrid automatic repeat request acknowledgement (HARQ-ACK) operation.

In an aspect, a method for configuring a frame structure for a new radio access technology (RAT) by a network node in a wireless communication system is provided. The method includes configuring a first frame which has one legacy transmission time interval (TTI) and a second frame which has multiple short TTIs, and communicating with a user equipment (UE) by using at least one of the first frame and the second frame.

In another aspect, a network node for a new radio access technology (RAT) in a wireless communication system is provided. The network node includes a memory, a transceiver, and a processor, coupled to the memory and the transceiver, that configures a first frame which has one legacy transmission time interval (TTI) and a second frame which has multiple short TTIs, and controls the transceiver to communicate with a user equipment (UE) by using at least one of the first frame and the second frame.

New frame structure can be configured for new RAT.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
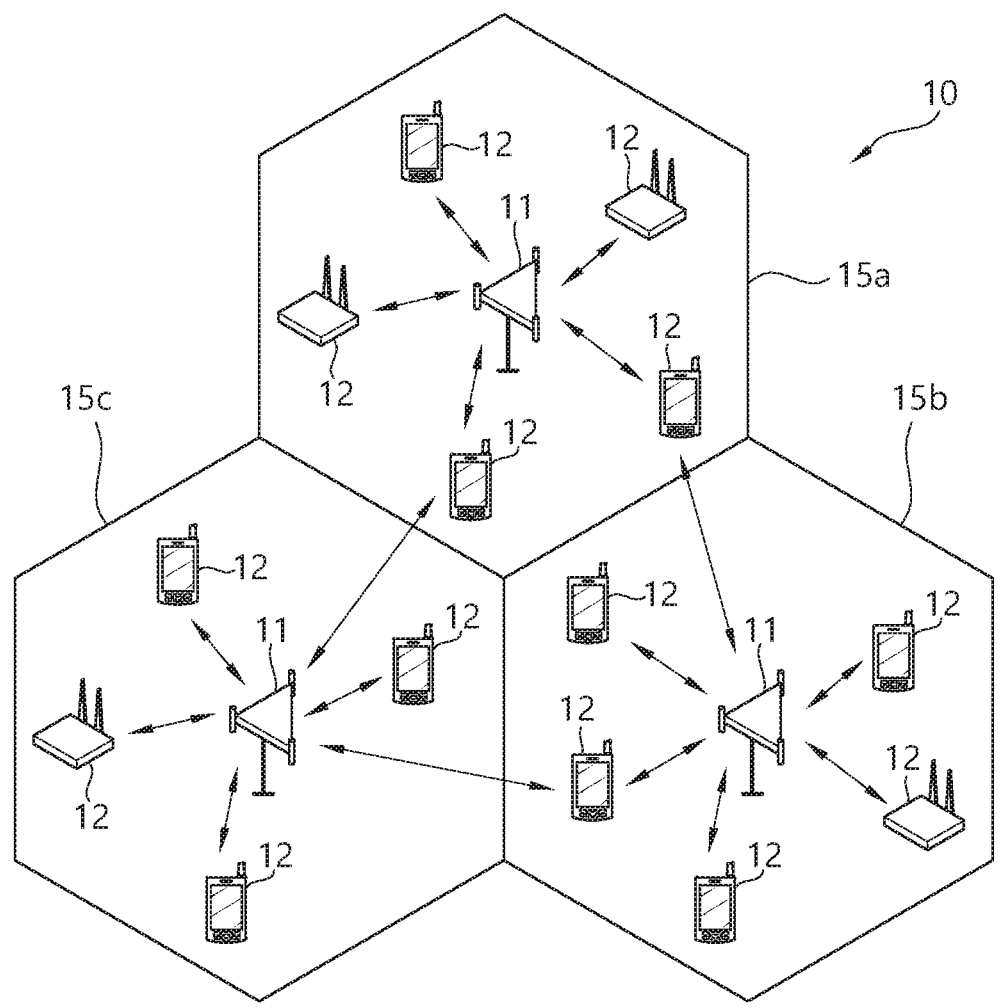
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
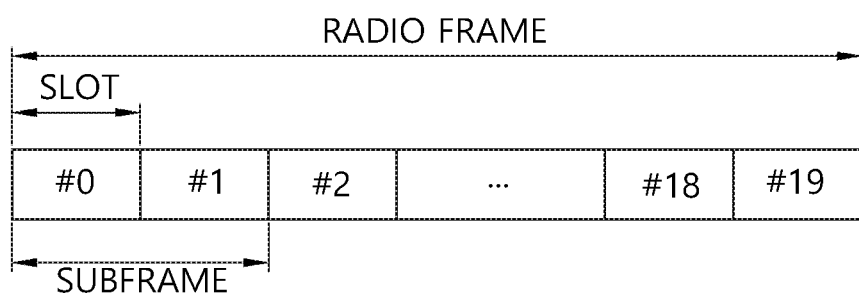
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

Figure 3:
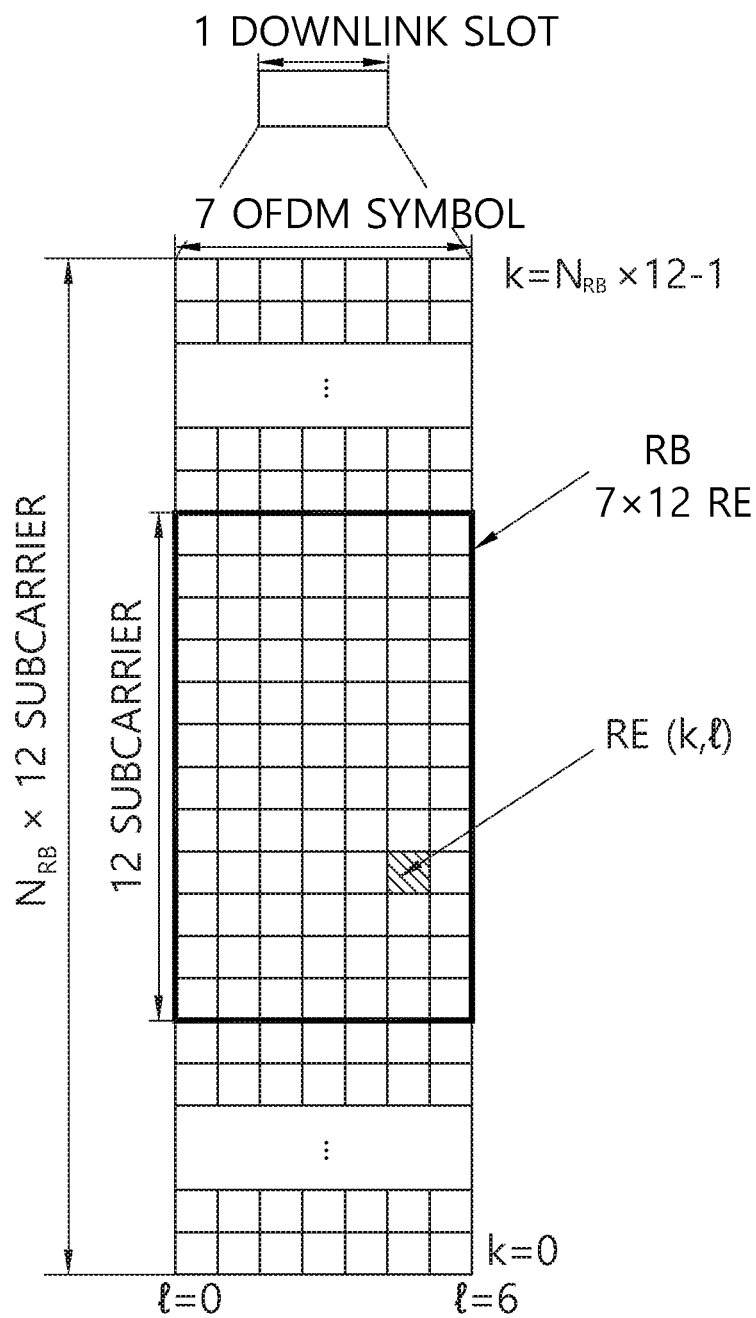
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number NDL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, and 2048 may be selectively used as the number of subcarriers in one OFDM symbol.

5th generation mobile networks or 5th generation wireless systems, abbreviated 5G, are the proposed next telecommunications standards beyond the current 4G LTE/international mobile telecommunications (IMT)-dvanced standards. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things. Hereinafter, 5G technology may be referred to as new radio access technology (RAT).

In new RAT, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further in new RAT, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

Figure 4:
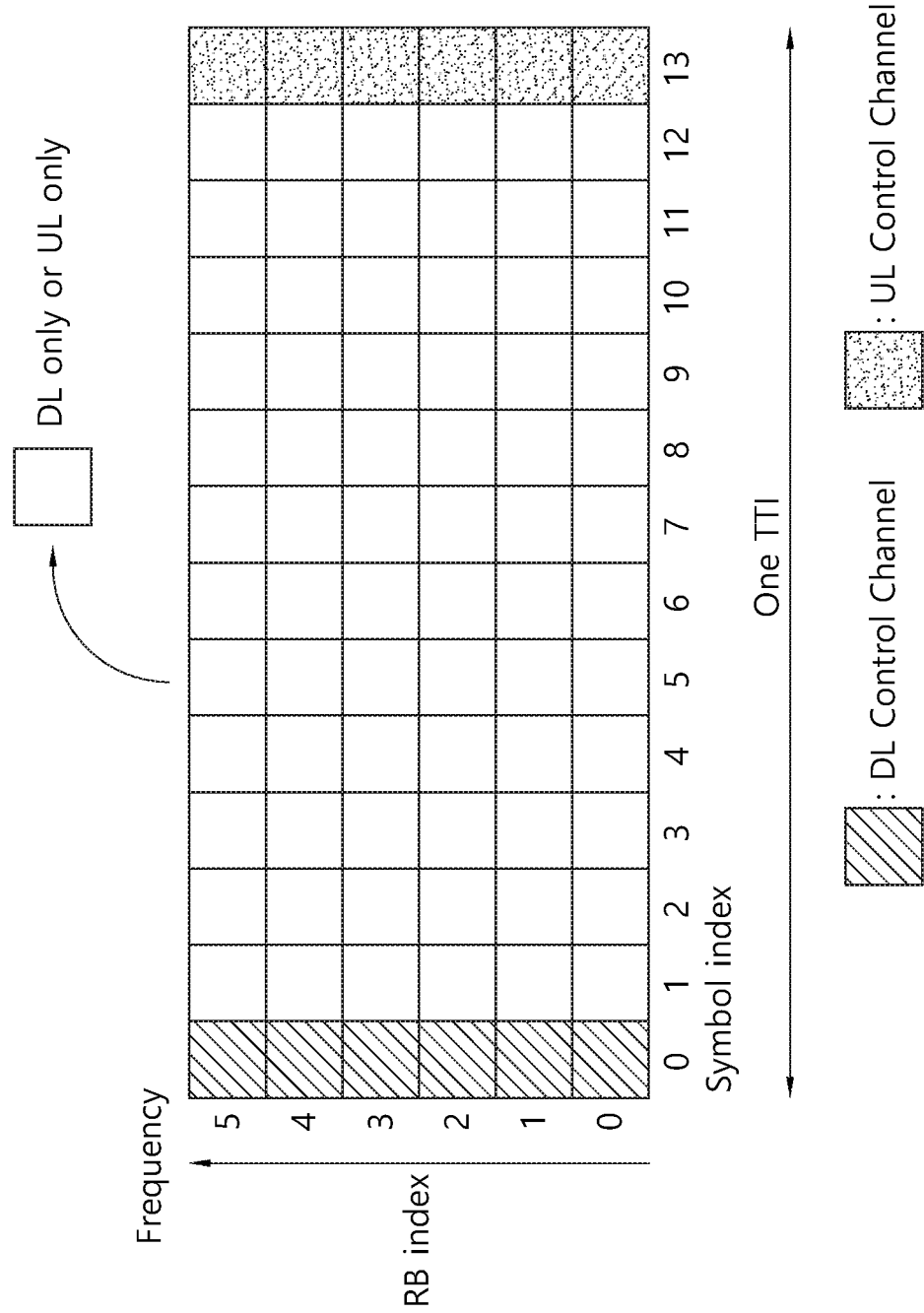
FIG. 4 shows an example of subframe type for new RAT.

FIG. 4 shows an example of subframe type for new RAT. The subframe shown in FIG. 4 may be used in TDD system of new RAT, in order to minimize latency of data transmission. Referring to FIG. 4, the subframe contains 14 symbols in one TTI, like the current subframe. However, the subframe includes DL control channel in the first symbol, and UL control channel in the last symbol. The remaining symbols may be used for DL data transmission or for UL data transmission. According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

Hereinafter, the present invention discusses transmission mechanism and resources used for synchronization signals, physical broadcast channel (PBCH), system information block (SIB) and physical random access channel (PRACH) related procedure for the new RAT, particularly considering forward compatibility in which different UEs are supported with different requirements in terms of radio frequency (RF)/baseband processing capability, latency requirements, power requirements, etc. For example, enhanced mobile broadband (eMBB) high data rate UEs with massive internet-of-things (IoT_devices with relatively lower data rate and extremely limited RF/baseband capability may be supported, compared to regular UEs or eMBB high data UEs. However, the present invention which will be described below may be applied to LTE technology wherever applicable.

To allow coexistence of different use cases, at least one of the following aspects may be considered.

Different RF/baseband bandwidth capability: For example, an IoT device may support only very limited bandwidth such as M MHz of bandwidth or P*one subcarrier spacing. For another example, an IoT device may support 12*one subcarrier spacing (e.g. 12*7.5 kHz=90 kHz).

Different processing capability in terms of encoding/decoding: For example, an IoT device may not support high processing decoding, such as turbo decoder or low-density parity-check (LDPC). If any common channel is shared among different UEs, this may be taken into account. For this manner, separate SIB may be transmitted per each UE. Alternatively, one main SIB or PBCH may be shared and different branch from the common channel may be allowed.

Different number of possible concurrent UEs attempting to access the cell: For example, though IoT device may not access the cell frequently, there may be many IoT devices attempting accessing the cell given a time duration. Handling massive UEs may require separate PRACH resource configuration or handling of RACH procedure differently.

Different synchronization requirement: For example, an IoT device may be supported by joint transmission from multiple cells to improve coverage. This may require larger CP overhead compared to other high data rate UEs.

Different subcarrier spacing: Due to different synchronization requirement or multiplexing capacity requirements, different subcarrier spacing may be used.

Different coverage requirement: Depending on use case, coverage and the required repetition numbers may be different.

1. Synchronization Signal for the New RAT According to an Embodiment of the Present Invention is Described.

For example, due to different subcarrier spacing and/or different RF/baseband requirement, synchronization signals, such as primary synchronization signal (PSS)/secondary synchronization signal (SSS), for eMBB and massive machine-type communication (mMTC) UEs may be different from the legacy synchronization signal. For example, synchronization signals for eMBB UEs may be transmitted over larger than M MHz of the lowest bandwidth supported UEs sharing the same spectrum. In this case, at least one of following approaches may be considered.

(1) The common synchronization signals over the minimum system bandwidth (e.g. M MHz) may be transmitted, and the same density of PSS/SSS may also be transmitted. The density may be determined by the coverage that the network intends to support.

(2) Base sequence of synchronization signal may be transmitted in the minimum system bandwidth with the minimum density required for general UEs. For general UEs, repetition in frequency domain may be considered. And for high coverage requiring UEs, repetition in time domain may be considered. For example, minimum system bandwidth may be 180 kHz with 15 kHz subcarrier spacing with 12 subcarriers, and the bandwidth used for general UEs may be 1.4 MHz which may be repeated 6 times in frequency domain. On the other hand, for high coverage requiring UEs, repetition over multiple subframes may be considered. When repetition occurs in frequency domain, different root sequence may be used (which may affect overall peak-to-average power (PAPR)) or orthogonal cover code (OCC) may be applied over repetitions in frequency domain. Similar mechanism may be applied to repetition in time domain as well. From a UE perspective, if the network supports its UE type, appropriate repetition in either frequency domain or time (or both) domain may be used. In terms of repetition in frequency domain, the repetition may be done consecutively or discontinuously over the frequency.

(3) Base sequence of synchronization signal may be based on synchronization signal system bandwidth designed for general UEs (e.g. 72 subcarriers*subcarrier spacing). For example, if the system bandwidth is K*M MHz, the base sequence may be mapped over k OFDM symbols for UE with lower bandwidth capability. In terms of mapping, M1, M2 . . . Mk may be mapped over K OFDM symbols. Assuming a center frequency of a carrier where synchronization signal is transmitted, center frequency of the system bandwidth/carrier may be the same as the center frequency of synchronization signal for general UEs. Thus, if the channel raster is the same between different UEs, it means that center frequency of synchronization signals for low bandwidth UEs may be offset from the center of general UEs' synchronization signal. This offset may be prefixed. Alternatively, center frequency of system bandwidth/carrier may be the same as the center frequency of synchronization signal for low bandwidth UEs.

(4) Separate synchronization signal may be configured between two types of UEs: In this case, to allow synchronization signal transmissions from different UEs, it is necessary to reserve some frequency regions for different types of UEs. This means that some signals/channels such as beam reference signal (RS) or PBCH or SIB may not be mapped to those reserved regions. At least a few potential regions may be reserved for future use of different system deployment or supporting different types of UEs.

For the reserved regions, the following approaches may be considered. Within the reserved time resource, any cell-common and/or group-common channels/RS/signals may not be transmitted.

Frequency resource(s) is reserved: For example, to allow different subcarrier spacing, frequency resource may be reserved. For the reserved frequency resources, the resources aligned with channel raster of low bandwidth UEs or future UEs may be considered. Generally, the same channel raster assumption may be used regardless of UE type. Thus, some frequency location which are aligned with channel raster may be reserved for future uses or supporting some different types of UEs.

Time resource(s) is reserved: For example, similar to legacy multicast-broadcast single-frequency network (MBSFN) subframe configuration, different types of future use subframes may be considered. In such subframes, one or a few symbols may be still used for control (DL and/or UL) transmissions. Within the reserved time resource, any cell-common and/or group-common channels/RS/signals may not be transmitted.

Time/frequency resource(s) is reserved: Both time and frequency domain may be considered for the reserved resources.

Beam direction(s) is reserved: Certain resources associated with a certain beam may be reserved. This implies that subcarrier spacing and/or CP length may be different per beam direction. In case below 6 GHz, this may be associated with a certain channel state information (CSI) RS and its associated virtual cell.

If different subcarrier spacing is used, it may be necessary to fix synchronization signal (if they are common across UEs with different applications/subcarrier spacing values)

2. Empty Frequency/Time Resources

It is expected that some resources should be reserved for potential new services in future. The reason of reserving some frequency/time resource is to allow potentially different numerology (such as subcarrier spacing/CP length) and/or potentially different frame structure. In this sense, it is important to not allocate any available resources in frequency and time domain to one specific application. For example, the system bandwidth may not be entirely used for transmission of cell-specific signals, such as reference signals and channels. Also, it may be desirable to reserve some resources over the entire frequency domain rather than reserving some resources at the edge of system bandwidth. In this sense, it may be generally desirable to transmit any cell-specific RS and/or channel in rather discontinuous frequency resources. For example, PBCH may be transmitted in PRBs which are rather distributed over the system bandwidth, assuming minimum bandwidth. For example, if the minimum bandwidth is 20 MHz, and the number of PRBs are 20 with 75 kHz subcarrier spacing and PBCH uses 6 PRBs in one TTI, instead of placing PBCH in a contiguous 6 PRBs, PBCH may be transmitted over 1 PRB in every 3 PRBs (or 2 PRBs excluding some PRBs used for synchronization signals). By this way, at least one or a few PRBs between PBCH PRBs may be reserved for some other future uses. Since additional RS and/or channels (cell-specific) may be transmitted in one TTI or one OFDM symbol, it may be also desirable to have discontinuous transmission of such RS/channels as well. Overall, the idea is to reserve at least one or a few subcarriers/RBs between two consecutive cell-specific RS/channels for future uses. The location of cell specific RS/channels may be determined based on cell ID and/or subframe and/or radio frame and/or frame index.

Alternatively, signal system bandwidth may be signaled in synchronization signal where different frequency region can be used for different applications. For example, transmission of cell-specific RS may be different based on system bandwidth.

3. Frame Structure

It is expected that different frame structure may be necessary for the new RAT. Particularly, different frame structure in which UL and DL may be present in every subframe or may change very frequently in the same carrier may be necessary for the new RAT. Different application may require different minimum size of DL or UL portions to support different latency and coverage requirements. For example, mMTC for high coverage case may require relatively long DL and UL portion so that one transmission can be successfully transmitted. Furthermore, due to different requirement on synchronization and tracking accuracy requirements, different subcarrier spacing and/or different CP length may be considered. In this sense, it is necessary to consider mechanisms to allow different frame structures coexisting in the same carrier and be operated by the same cell/eNB.

For the convenience, it is assumed in the description below that a frame structure type 1 (FS1) and a frame structure type 2 (FS2) are configured and coexist in the same carrier. The FS1 may be a baseline frame structure used for such as for eMBB use cases or typical use cases. The FS2 may be used for some other applications such as mMTC, ultra-reliable and low latency communication (URLLC), an enhanced vehicle-to-everything (eV2X) communication. The network or a cell may support one or multiple frame structures at the same time. For the convenience, the present invention may discuss relationship between two frame structures. However, more than two frame structures may be supported simultaneously.

A. FS2 for mMTC/URLLC in FDD Case

In this case, one TTI of FS2 may consist of a few (e.g. 'm') TTIs of FS1. For example, if one TTI of FS1 is X ms, one TTI of FS2 may be 'm'*X ms. For determining 'm', at least one of the following approaches may be considered.

'm' may be predetermined. 'm' may be different per frequency or frequency range or frequency bands. To support variable coverage level or repetition level, it may be desirable to have different 'm' per repetition level. 'm' may be $2^N$, where N=0, ... P.

'm' may be determined based on subcarrier spacing used for mMTC. For example, if 15*K1 kHz subcarrier spacing is used for FS1, and 15 kHz subcarrier spacing is used for FS2, 'm' may be same as K1 or multiple of K1.

Combination of the above two approaches may also be considered.

Figure 5:
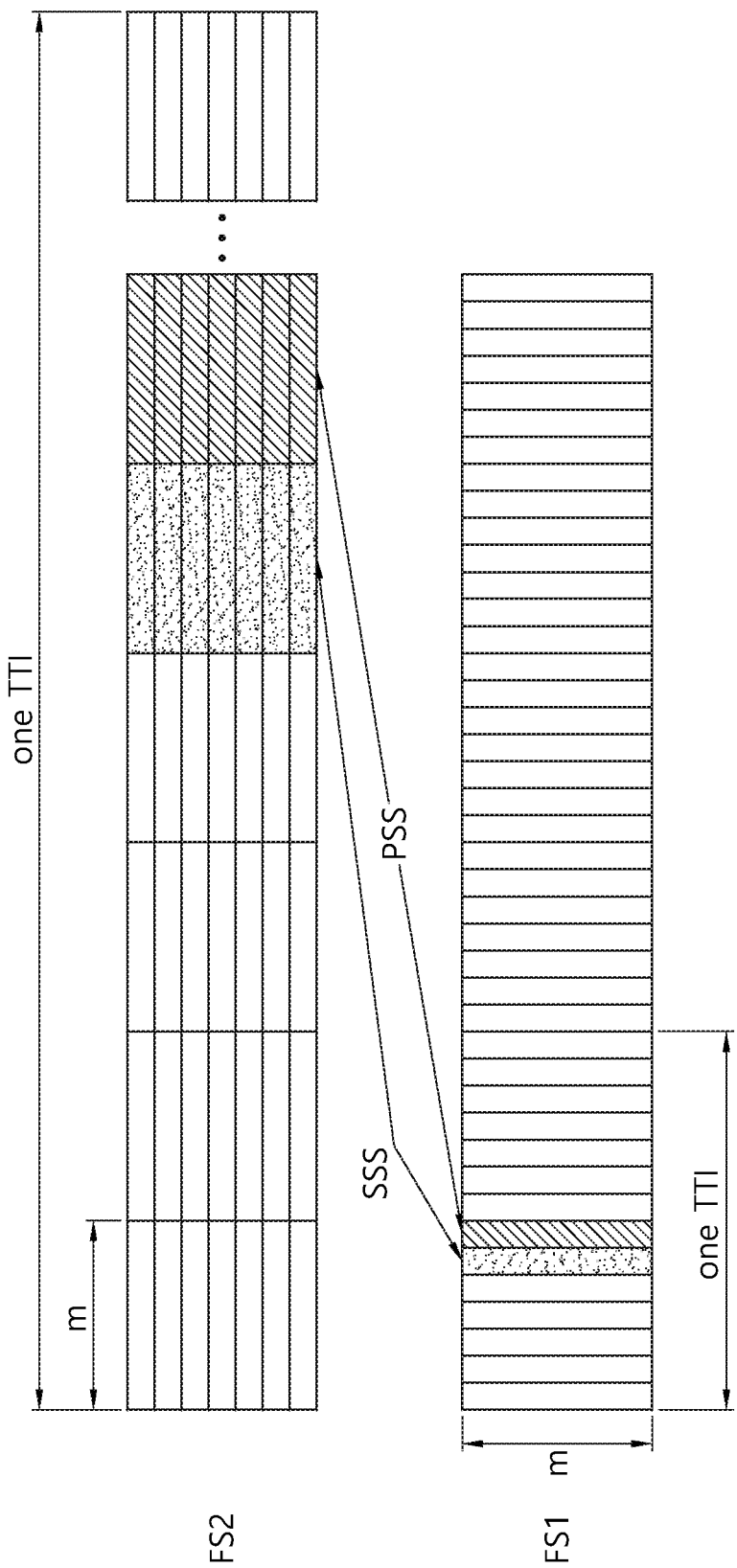
FIG. 5 shows an example of a frame structure for a new RAT according to an embodiment of the present invention.

FIG. 5 shows an example of a frame structure for a new RAT according to an embodiment of the present invention. Referring to FIG. 5, it is shown that FS1 is the same as the conventional frame structure, as one TTI includes 14 symbols. That is, one TTI of FS1 is 1 ms. On the other hand, one TTI of FS2 is 'm' ms. 'm' may be predetermined. Or, 'm' may be determined based on subcarrier spacing used for mMTC.

If different subcarrier spacing is used, it may be necessary to have a gap between two different subcarrier regions. Also, for transmission of synchronization signals, collision between FS1 OFDM symbol carrying PSS and/or SSS and FS2 OFDM symbol carrying PSS and/or SSS should be avoided. For this, FS1 and FS2 may be configured by TDM manner. For this, in terms of system information or master information block (MIB) signaling, a set of subframes not usable may be configured. In other words, the set of available subframes for each FS may be signaled by each system information carried in each FS respectively. However, a set of available TTIs/subframes may not reflect the case where one or a few OFDM symbols within one TTI should not be used. For example, one OFDM symbol of FS2 colliding with synchronization signal(s) of FS1 may be excluded/punctured/rate matched. One or a few patterns of available OFDM symbols per TTI may be configured and signaled per each FS or to FS2. For example, patterns may be {all OFDM symbols available}, {the first symbol is not available}, {the first symbol in each slot is not available}, etc.

Alternatively, CP length of FS2 may be configured smaller than m*CP length of FS1. The remaining portion may be used for gap or blank region between FS1 and FS2.

Figure 6:
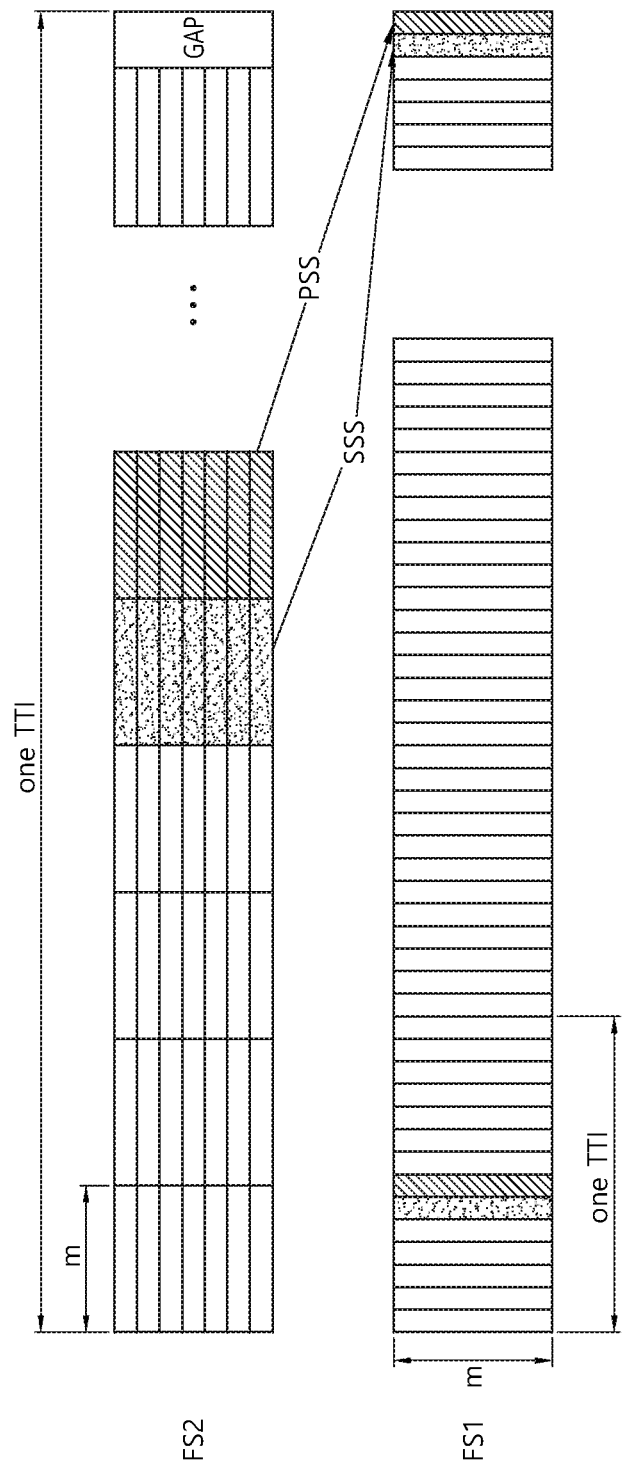
FIG. 6 shows another example of a frame structure for a new RAT according to an embodiment of the present invention.

FIG. 6 shows another example of a frame structure for a new RAT according to an embodiment of the present invention. Referring to FIG. 6, like FIG. 5, one TTI of FS1 is 1 ms, and one TTI of FS2 is 'm' ms. However, CP length of FS2 is configured smaller than m*CP length of FS1, so gap occurs at the end of FS2. PSS/SSS of FS1 may be transmitted in gap of FS2, in order to avoid collision.

Alternatively, when FS2 is constructed, additional gap may be considered, regardless of CP length, such that PSS/SSS (and also necessary system bandwidth wide signals such as CSI-RS, extended synchronization signal (ESS)) can be transmitted. In other words, one or a few OFDM symbols may be reserved for some other purposes in FS2. For reservation, different CP may be configured so that the number of OFDM symbols within one TTI can be totally smaller than the size of one TTI (e.g. OFDM symbol size of 80 us*12=960 us in 1 ms TTI leaves 40 us gap). Or, some OFDM symbols may be reserved for further uses. The future use or some other uses may include CSI-RS transmission, UL control transmission, DL control transmission, etc. Depending on reason of reservation, the gap may be formed in the beginning of each TTI (or multiple TTIs) or end of each TTI (or multiple TTIs). To support this, system bandwidth side signals of FS1, such as CSI-RS, ESS, PBCH, etc., may be transmitted in the beginning of TTI or ending of the TTI such that reservation on FS2 may be placed in the beginning or ending of TTI of FS2.

Meanwhile, in order to reduce latency, short TTI which may be shorter than current TTI (i.e. 1 ms) has been considered. For example, length of short TTI may be one of 1/2/3/4/7 symbols. When a short TTI is introduced for latency reduction in LTE, E-UTRAN may be configured with both normal TTI with 1 ms and short TTI with a value less than 1 ms, such as 1 symbol or 0.5 ms. With keeping the current LTE frame structure, OFDM symbol length, subcarrier spacing, etc., reduction of TTI generally means smaller transport block size (TBS) contained in one TTI, and relatively larger control overhead if DCI size is kept as the same.

When short TTI is adopted, and as a result, the number of OFDM symbols in reduced in one TTI (e.g. from 14 to 2) or subcarrier spacing increases (e.g. from 15 kHz to 60 kHz), a RB size may be different from the current RB size. For example, with subcarrier spacing of 60 kHz, one RB may include 12×8 resource elements, instead of 12×14 resource elements. For another example, when TTI length is 2 OFDM symbol length, one RB may include 12×2 resource elements. If short TTI is used, particularly with smaller number of OFDM symbols, larger RB size in frequency domain may be considered (e.g. one RB includes 48×2 resource elements).

It is generally desirable to use short TTI for control. However, it may increase control overhead and thus decrease the overall performance benefit with short TTI operation. Thus, it may be desirable to support different TTI length per different application/packet.

Hereinafter, as a proposal for FS2, a nested frame structure using short TTIs according to an embodiment of the present invention is described. It is assumed that "K" different levels (or lengths) of short TTIs is supported in the network. For example, level 1 may correspond to the legacy TTI length (e.g. 14 OFDM symbols with normal CP), which means 1 TTI in the network. Level 2 may correspond to 7 OFDM symbols, which means 2 TTIs in the network, and so on.

Figure 7:
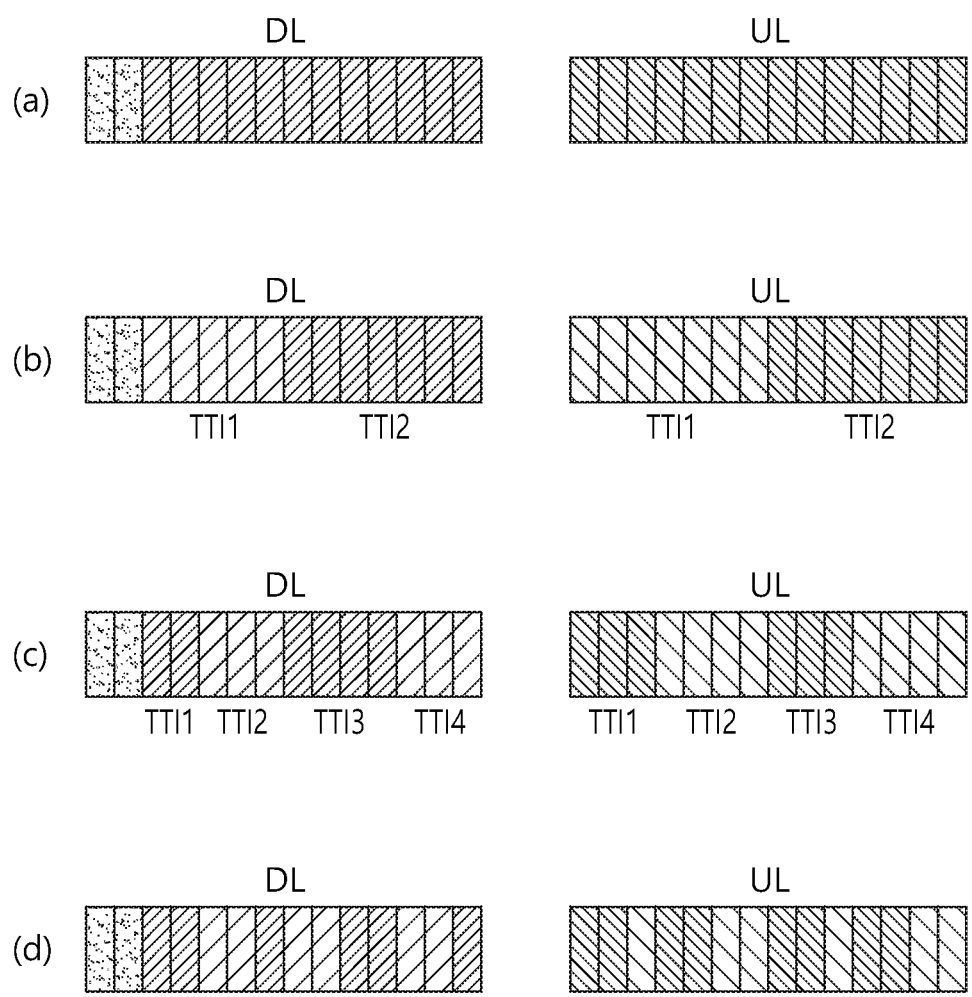
FIG. 7 shows an example of nested frame structure for a new RAT according to an embodiment of the present invention.

FIG. 7 shows an example of nested frame structure for a new RAT according to an embodiment of the present invention. Different TTI length may be used between FS1 and FS2. FIG. 7-(a) corresponds to level 1, in which one TTI includes 14 OFDM symbols. Level 1 may be called FS1. FIG. 7-(b) corresponds to level 2, in which one short TTI includes 7 OFDM symbols. That is, one TTI of FS1 includes two short TTIs of FS2. FIG. 7-(c) corresponds to level 3, in which one short TTI includes 3/4 OFDM symbols. That is, one TTI of FS1 includes 4 short TTIs of FS2. FIG. 7-(d) corresponds to level 4, in which one short TTI includes 1/2 OFDM symbols. That is, one TTI of FS1 includes eight short TTIs of FS2.

Accordingly, depending on the needed number of short TTIs within one TTI (from 1 to 8, and 14), short TTIs may be placed. However, in FIG. 7-(c), instead of 4/3/4/3 OFDM symbols for short TTIs, 3/4/3/4 OFDM symbols or 3/4/4/3 OFDM symbols or 3/3/4/4 OFDM symbols or 4/4/3/3 OFDM symbols may be used. Similar rotation for 1/2 OFDM symbol may also be applied to FIG. 7-(d). In case of 1 OFDM symbol case, total of 14 short TTIs may be placed. Similar mechanisms may be applied to different OFDM symbols per TTI (e.g. 12 or 10). The proposed frame structure described above may allow that short TTI may be nested to the next level short TTI. In other words, one short TTI of one level may be divided to 2 short TTIs of the next level (except from 8 short TTIs to 14 short TTIs).

In the proposed frame structure, the first one or two OFDM symbols of DL may be used for legacy control region, and the last OFDM symbol of UL may be reserved for sounding reference signal (SRS) transmission (or to minimize the impact by legacy SRS). In terms of SRS transmission for a short TTI supporting UE, the following two approaches may be considered.

(1) If additional SRS configuration is given to short TTIs, a UE may transmit additional SRS according to short TTI configuration. If additional SRS transmission is considered, SRS may be transmitted in the last OFDM symbol of the configured short TTI for level 2 TTI structure. For level 3 and 4, the first OFDM symbol may be used for SRS except for the last short TTI in the legacy TTI. This additional SRS configuration may be cell-specific and may be configured per each TTI configuration. Thus, potentially multiple SRS configuration may be given. A UE configured with one level may perform rate matching or puncture in cell-specific SRS configuration of higher levels (i.e. shorter TTIs) to protect SRS. For example, if a UE is configured with level 2, and the cell also configures SRS for level 3, the UE may puncture or performing rate matching around SRS symbols of level 3.

(2) Only legacy SRS configuration may be used, and additional SRS transmission in short TTI may not be used.

More specifically, in FDD, option (2) above may be used. In TDD, option (1) may also be considered.

With the nested frame structure, a UE supporting short TTI may be configured with multiple short TTI levels for control channel monitoring. For example, if level 4 is configured, the UE may monitor control channel in OFDM symbol 0 (possibly for legacy PDCCH), OFDM symbols 2, 4, 6, 7, 9, 11, and 14. In each short TTI, the multiple TTIs or variable TTI may schedule up to the maximum number of total short TTIs in the legacy TTI or multiple of the maximum short TTI numbers (e.g. 8 or 8*k in this example). For example, if a UE is scheduled with 4*sTTI in 2nd short TTI with level 2, PDSCH may be scheduled in 2nd, 3rd, 4th, 5th short TTIs, which in total of 7 OFDM symbols in length. The level may be determined by short TTI length used for control channel monitoring. More specifically, if the first short TTI schedules PDSCH, and the legacy PDCCH length is equal or larger than the size of short TTI, data may not be mapped to the fully overlapped short TTI. However, it may be counted for multiple TTIs scheduling. In other words, data may be rate matched, though it has been scheduled.

It may be good to restrict the size of data channel only for a few cases (e.g. 1 symbol, 2 symbols, 4 symbols, 7 symbols and 12 symbols). It may be required by the network to schedule data properly not to vary the size of PDSCH in terms of OFDM symbols. For this, similar to ACK/NACK transmission, the timing from control channel to data channel may be considered. The timing from control channel to data channel may be signaled via number of short TTIs where short TTI length can be determined by sPDCCH TTI length (e.g. level 4). Alternatively, the basic short TTI length for ACK/NACK may also be determined by higher layer separately. In other words, a basic short TTI length or the level of short TTI used in DL and UL may be configured, respectively. Based on the basic short TTI length, multi/variable TTI scheduling which allows scheduling longer than the configured TTI length may be considered. If the first symbol is reserved for control channel in every short TTI, PDSCH may be rate matched in such OFDM symbols. Otherwise, data may be transmitted in the first control region of every short TTI as well, and data may be rate matched around its own scheduling DCI. Multi/variable TTI scheduling may be expanded to the next longer short TTI or level 1 TTI. If level 4 is used, data may not be scheduled in the same short TTI if the short TTI length is 1 OFDM symbol. For example, only 2 bits of 1, 2, 4, 8 multiple short TTIs may be scheduled in level 4 which allows PDSCH transmission ends aligned with the next higher level short TTI.

Figure 8:
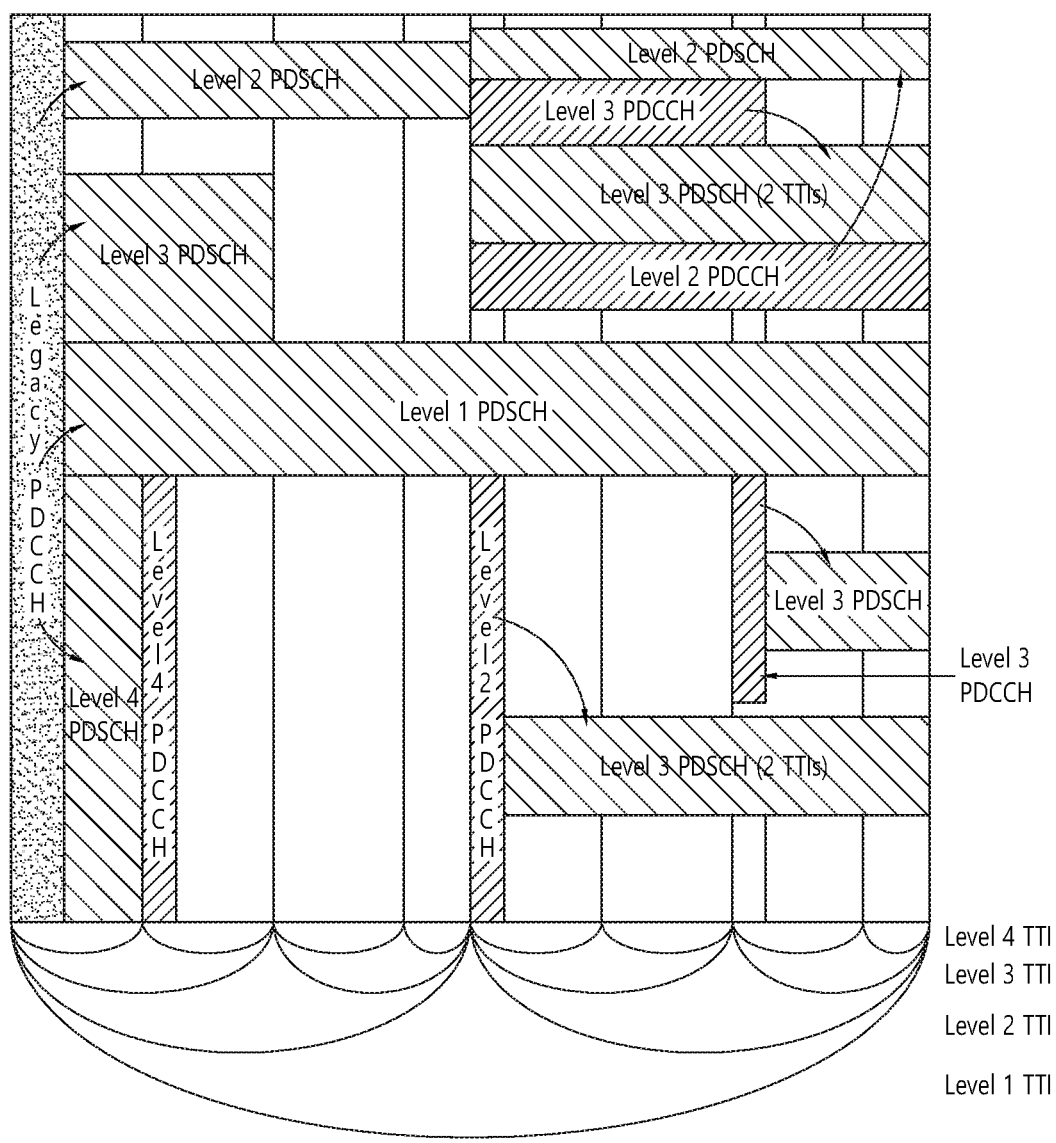
FIG. 8 shows an example of scheduling of multiple and different TTI via different TTI levels.

FIG. 8 shows an example of scheduling of multiple and different TTI via different TTI levels. Referring to FIG. 8, legacy PDCCH may schedule PDSCH of level 1, 2, 3 and 4. PDCCH of each level may schedule PDSCH of each level. That is, PDCCH of level 2 may schedule PDSCH of level 2, PDCCH of level 3 may schedule PDSCH of level 3, and PDCCH of level 4 may schedule PDSCH of level 4.

One drawback of the nested frame structure described above is that it leads different TTI lengths among short TTIs in the same level. To overcome this problem, partial overlap between two short TTIs may be considered.

Figure 9:
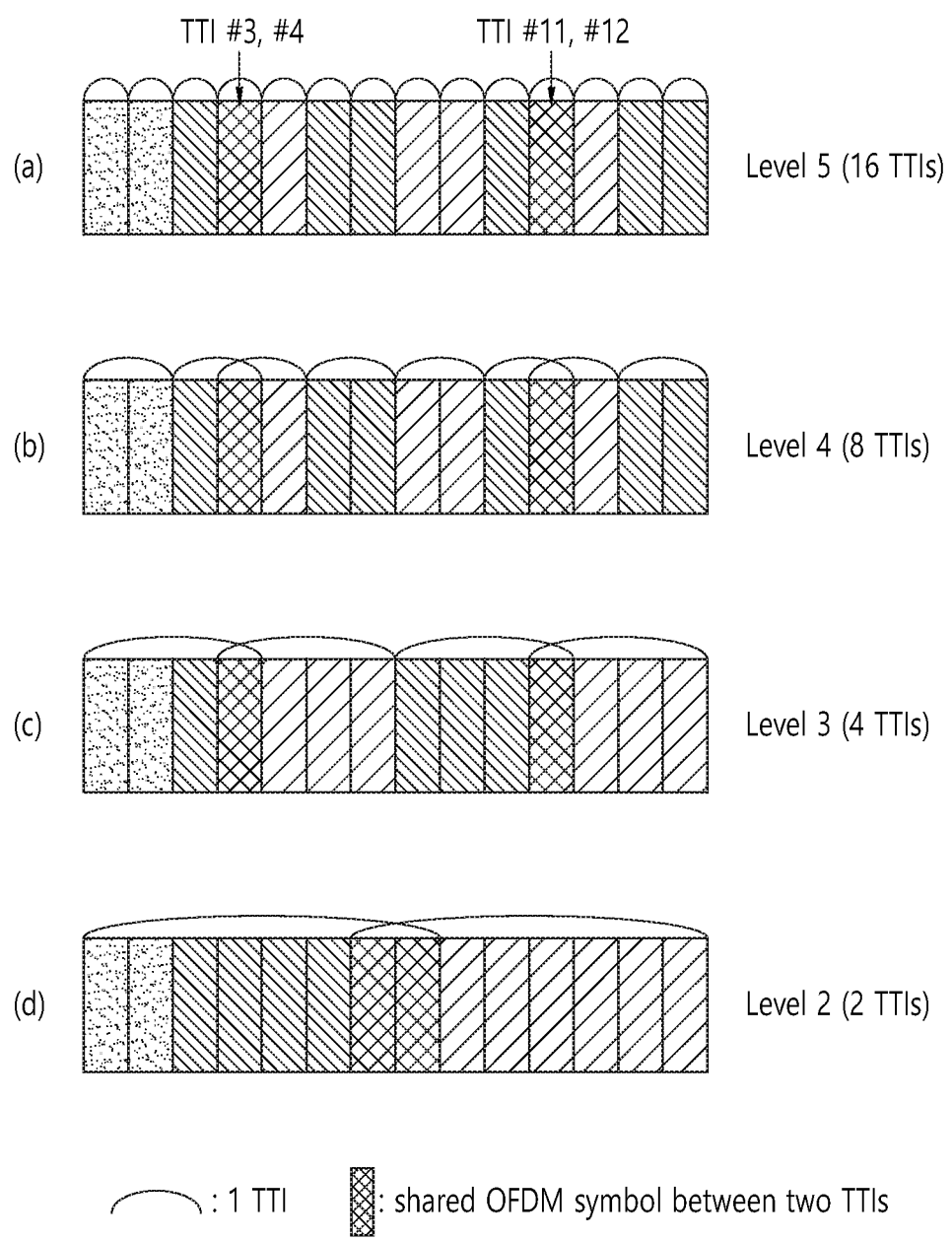
FIG. 9 shows an example of overlapped short TTI in a nested frame structure for a new RAT according to an embodiment of the present invention.

FIG. 9 shows an example of overlapped short TTI in a nested frame structure for a new RAT according to an embodiment of the present invention. That is, in the nested frame structure, short TTIs may be overlapped/shared to allow $2^N$ symbols per TTI. FIG. 9-(a) shows level 5 in which 16 short TTIs, instead of 14 short TTIs, are configured. In order to configure 16 short TTIs, fourth OFDM symbol are shared between TTI #3 and TTI #4, and eleventh OFDM symbol are shared between TTI #11 and TTI #12. FIG. 9-(b) shows level 4 in which 8 short TTIs are configured. In order to configure 8 short TTIs which has the same length, fourth OFDM symbol are shared between TTI #1 and TTI #2, and eleventh OFDM symbol are shared between TTI #5 and TTI #6. FIG. 9-(c) shows level 3 in which 4 short TTIs are configured. In order to configure 4 short TTIs which has the same length, fourth OFDM symbol are shared between TTI #0 and TTI #1, and eleventh OFDM symbol are shared between TTI #2 and TTI #3. 9-(d) shows level 2 in which 2 short TTIs are configured. In order to configure 2 short TTIs which has the length of 8 OFDM symbols, seventh and eighth OFDM symbols are shared between TTI #0 and TTI #1. The embodiment shown in FIG. 9 is only exemplary, and actual OFDM symbol which is shared between different short TTI may be changed. The idea is to allow some OFDM symbols overlapped among different short TTIs to align short TTI lengths.

The drawback of the above approach is that control/data between two different short TTIs may be overlapped in the overlapped OFDM symbols, which may affect the overall FDM performance of control/data channels. However, if data and control is multiplexed by FDM, this overlap between control and data may be manageable if TDM between control and data is assumed. Alternatively, as the issue becomes more significant in level 2, overlap may not be considered in level 2.

Figure 10:
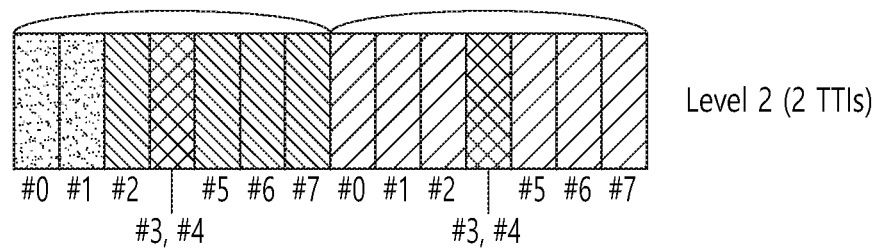
FIG. 10 shows another example of overlapped short TTI in a nested frame structure for a new RAT according to an embodiment of the present invention.

FIG. 10 shows another example of overlapped short TTI in a nested frame structure for a new RAT according to an embodiment of the present invention. Referring to FIG. 10, short TTI length may be configured as 7 actual OFDM symbols and fourth OFDM symbol may be mapped to #3 and #4 in each slot, respectively.

The above approach may be applied to other levels as well. This may be explained that virtually there are 16 OFDM symbols which are mapped to physically 14 OFDM symbols. In this way, the design working for 16 OFDM symbols may be incorporated to 14 OFDM symbols cases (and vice versa). More specifically, in case from 16 OFDM symbols to 14 OFDM symbols, one OFDM symbol may be dropped between #3 and #4. In case from 14 OFDM symbols to 16 OFDM symbols, OFDM symbol #3 may be repeated. In terms of sharing OFDM symbol, at least in TDD, it is desirable to use OFDM symbol #3 (in normal CP) in each slot may be preferable considering DM-RS position.

When OFDM sharing is used, the number of OFDM symbols of multi/variable TTI scheduling may consider actual number of OFDM symbols in which multiple TTIs are spanning. In this sense, the total number of scheduled length may be smaller than multiple of short TTI length. This approach may allow that the number of OFDM symbols in each short TTI is $2^N$, where N is 0, 1, 2 . . . K depending on the necessity of latency and UE processing power requirement. In the overlapped short TTI with level 5 (e.g. TTI #3 and #4), it may be necessary to indicate which TTI is used for control and/or data channel, which may be differentiated via scrambling of control/data (some other means may also be considered). This may be particularly important when HARQ-ACK timing is determined based on $2^N$ number of OFDM symbols or the number of short TTIs in one the largest TTI size. For example, if TTI #3 schedules with gap of 2 TTI for sPDSCH, this may imply that PDSCH will be scheduled in TTI #5 (which is next OFDM symbol to TTI #3), thus, the gap may be in fact one short TTI. This may simplify the operation if system may require operating in multiple different levels of short TTI lengths. The similar concept may be used for UL as well. In UL, collision in the same resource between two short TTIs with level 5 may be considered as collision and transmission on one channel may be dropped per rule (if the network schedules collisions). For example, the rule may be configured based on uplink control channel information (UCI) priority or based on timing.

For one example of the nested frame structure, if FS1 consists of 30 subframes, one subframe may be overlapped between two TTIs for FS2. If mMTC UE is scheduled in those overlapped TTIs, it may be counted only one as valid. Alternatively, instead of overlap of two TTIs, different TTI lengths may be configured. For example, level 2 of FS2 may have 1 TTIs with 2/2/2/2/1/2/2/2 in 1.5 ms range. Alternatively, reserve some resources may be reserved not used by mMTC devices. Those reserved resource blocks may be placed in any subframes consecutively or discontinuously. Alternatively, different levels may be defined by multiple of previous level's TTI length.

B. Frame Structure for mMTC in TDD Case

The above frame structure may be applied to a frame structure for mMTC in TDD. Additionally, in TDD, two different frame structures may be considered. One is a frame structure in which DL/UL switching may occur in a multiple TTI unit similar to current LTE TDD DL/UL configuration. The other is a frame structure that DL/UL switching may occur in every TTI to allow efficient DL and UL transmission and ACK/NACK transmission. For the latter case, DL control region and UL control region may need to be used for DL and UL, respectively, unless the network supports full duplex capability. If the network does not support full duplex capability, thus, it may be necessary to align DL portions between FS1 and FS2. For this, the following two approaches may be considered.

(1) FS1 configuration of DL/UL may be given to UEs of FS2, and UEs of FS2 may construct DL portion and UL portion according to DL/UL configuration of FS1. For example, if subcarrier spacing of FS2 is 2 times that of FS1, and the configuration of DL/UL configuration is DDDDD-UUUUU (where D indicates subframes in which PDSCH may be transmitted, and U indicates subframes in which PUSCH may be transmitted), then DL and UL portion of FS2 may be constructed as DDSUU, where D indicates DL control and PDSCH portions can be used for DL and U indicates PUSCH portion and UL control portion can be used for UL.

(2) FS2 configuration of DL/UL may be given to UEs of FS1, and UEs of FS1 may assume that subframe type (either PDSCH or PUSCH) may be determined by FS2 configuration, unless it's dynamically changed via scheduling or dynamic indication per each TTI. For example, assuming that the subcarrier spacing of FS2 is two times of that of FS1, FS2 may indicate DDDDDUUUUU. It may imply that default DL/UL configuration of FS1 is DDDDDDDDDD-UUUUUUUUU. More generally, a default DL/UL configuration of FS1 may be configured, and it may be overwritten by dynamic indication of subframe type change and/or via scheduling (e.g. DL grant or UL grant). Higher layer reconfiguration may also be considered.

In terms of configuration of FS1 default DL/UL configuration type, a subset of TTIs/subframes with fixed D or U may be configured. Those fixed subframes may not change the subframe type either via dynamic singling or dynamic scheduling. For FS2, those fixed subframes may be at least used. For other subframes, additional configuration of subframe type and/or DL/UL configuration and/or availability for FS2 UEs' usage may be configured.

Alternatively, In terms of configuration of FS1 default DL/UL configuration type, different types of subframe to FS1 UEs and FS2 UEs may be configured and FS1 UEs and FS2 UEs are multiplexed by FDM between DL and UL. FS1 UEs may be further classified between FS1 UEs with eMBB use cases and FS1 UEs with eV2X use cases. In other words, a subset of subframes with "D" type subframes may be fixed such that measurement signals and/or cell system bandwidth wide and/or cell specific signals/channels can be transmitted. For other subframes, the subframe type may be indicated as "U" from FS1 UE perspective such that sidelink resources can be configured/used in those resources, whereas the subframe type can be indicated as "D" from FS2 UE perspective. From the network perspective, the resource may be shared among FS1 and FS2 UEs and the network may transmit DL signals towards FS2 UEs. This may be applied to the same FS UEs depending on its communication/discovery types as well. In other words, partial resources may be allocated for sidelink resources which can be multiplexed by FDM with DL resources in the same TTI. However, from a UE perspective, it may either perform DL or SL transmission.

C. Frame Structure for URLLC in TDD Case

The above frame structure with different subcarrier spacing may be applied to a frame structure for URLLC in TDD. If short TTI needs to be used for FS2, more DL/UL switching points within one TTI or different subframe type may be used. Or, if shorter OFDM symbol lengths are used for URLLC UEs for FS2, in one TTI of FS1, there may be different OFDM symbols used for DL and UL between FS1 and FS2.

If the network does not support full duplex capability, it seems to be difficult to support different DL and UL in the same OFDM symbol duration. To minimize the impact, partial DL or UL transmission may be used in FS1. In partial DL or UL transmission, a UE may be scheduled with only one slot PDSCH or PUSCH transmission (if subcarrier spacing of FS2 is twice of FS1). In this case, the network may transmit data and then switch to UL and process URLCC uplink data. More generally, if FDM between FS1 and FS2 with different subcarrier spacing is used with potentially different UL/DL direction between FS1 and FS2, length of PDSCH or PUSCH scheduling and/or starting OFDM symbol index of PDSCH/PUSCH may be configured. Supporting partial PDSCH/PUSCH may be enabled by higher layer or dynamically indicated via common signaling or DCI or some signaling. Furthermore, FS2 needs to ensure DL control portion and UL control portion of FS1. Thus, first a few OFDM symbols may be used for DL control portion and last few OFDM symbols may be used for UL control portion. To minimize the DCI overhead, partial subframe length may be higher layer configured, and only starting position may be signaled. 0 or 1 may be used between partial and full TTI scheduling. Alternatively, it may also be combined with multiple TTI scheduling as well. Accordingly, partial TTI scheduling may be one of multi-TTI scheduling option.

Figure 11:
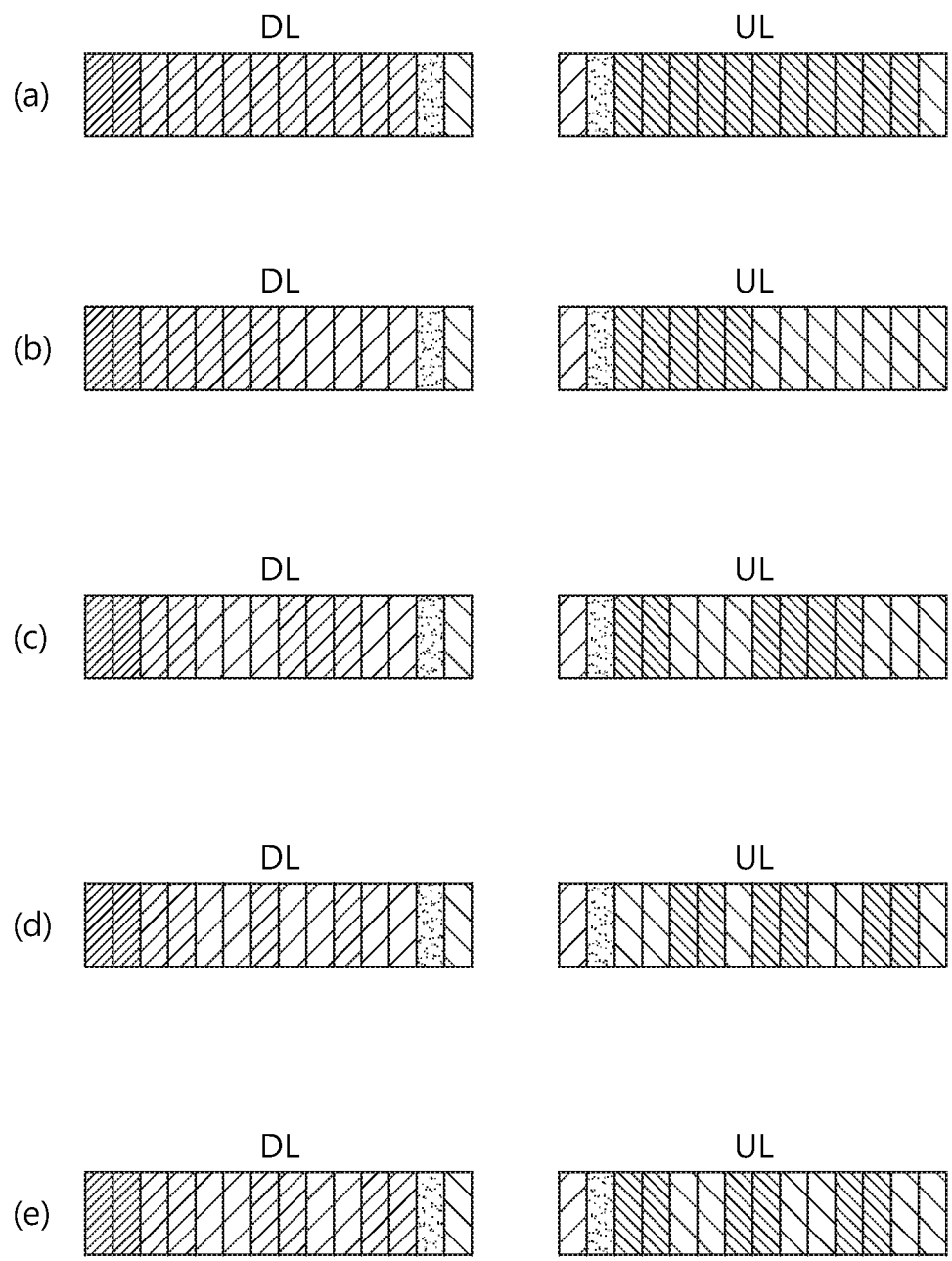
FIG. 11 shows another example of a frame structure for a new RAT according to an embodiment of the present invention.

FIG. 11 shows another example of a frame structure for a new RAT according to an embodiment of the present invention. FIG. 11 shows examples of frame structures when short TTIs are used in TDD. This may be treated similar to the above case with FDD, assuming that the last short TTI or first short TTI may not be used and gap symbol may be punctured or rate matched. FIG. 11-(a) corresponds to level 1, i.e. FS1. FIG. 11-(b) corresponds to level 2 of FS2, in which one short TTI consists of 6 OFDM symbols. 2 short TTIs are configured in one TTI of FS1. FIG. 11-(c) corresponds to level 3 of FS2, in which one short TTI consists of 3 OFDM symbols. 4 short TTIs are configured in one TTI of FS1. FIG. 11-(d) corresponds to level 4 of FS2, in which one short TTI consists of 1/2 OFDM symbols. For DL, short TTIs having 2/1/2/1/2/1/2/1 OFDM symbols are configured, and for UL, short TTIs having 1/2/1/2/1/2/1/2 OFDM symbols are configured. 8 short TTIs are configured in one TTI of FS1. FIG. 11-(e) corresponds to level 4 of FS2, in which one short TTI consists of 2 OFDM symbols. 6 short TTIs are configured in one TTI of FS1.

Meanwhile, similar to FDD case, different layout may also be possible. For example, if guard period or switching from DL to UL takes more than one OFDM symbol, portioning of short TTIs may be changed. Depending on the network capability, short TTI of FS2 may have different direction from FS1.

For both FDD and TDD, in terms of scheduling, FS1 UE may also be scheduled with FS2, and where only data portion may be mapped over multiple TTIs of FS2. In terms of resource mapping, UEs of FS1 may be configured with the size of FS2 (if any), and the bitmap may indicate the data mapping to a set of short TTIs of FS2. For example, if a case of FIG. 11-(e) is used, bitmap of 6 bits may be used to indicate to which short TTIs FS1 UE PDSCH can be mapped. For example, [1 1 1 1 0 0] may indicate that PDSCH is mapped to first four short TTIs, is not mapped to the last two short TTIs. Depending on the latency requirement, different level of short TTIs may be used for each packet. In terms of scheduling, a UE supporting short TTI may monitor DL control region in the lowest level that the network supports (which may be signaled by SIB or higher layer), or the level may be configured per UE or per session or per application. It is also possible that short TTI transmission may start in the middle of longer TTI transmission. In this case, preemption of longer TTI transmission may also be possible. To minimize the impact from this preemption, the network may send a common signal in short TTI control region which indicates whether there is any short TTI transmission or not. Alternatively, a longer TTI UE may perform blind search on data. Alternatively, in the next longer TTI control, the network may indicate whether there was interrupt in the previous transmission or not, and if so, the network may further indicate which short TTIs have been used.

In summary, the proposed frame structure may allow that shorter TTIs can be nested to the next level of short TTI. In other words, one TTI of one level may be divided to 2 short TTIs of the next level (except from 4 short TTIs to 6 short TTIs and 6 short TTIs to 12 short TTIs if nested frame structure for 8 short TTIs is not used, and if the nested frame structure is used, only exception from 8 short TTIs to 12 short TTIs). Similar to FDD case, the order between 1/2 in 8 short TTIs case may be changed. This nested frame structure may allow multi-TTI scheduling a bit easier. For example, the shortest TTI may be configured to allow potentially many control possibilities with multi-TTI scheduling to [1 . . . N], where N is the level of the configured short TTI level.

Figure 12:
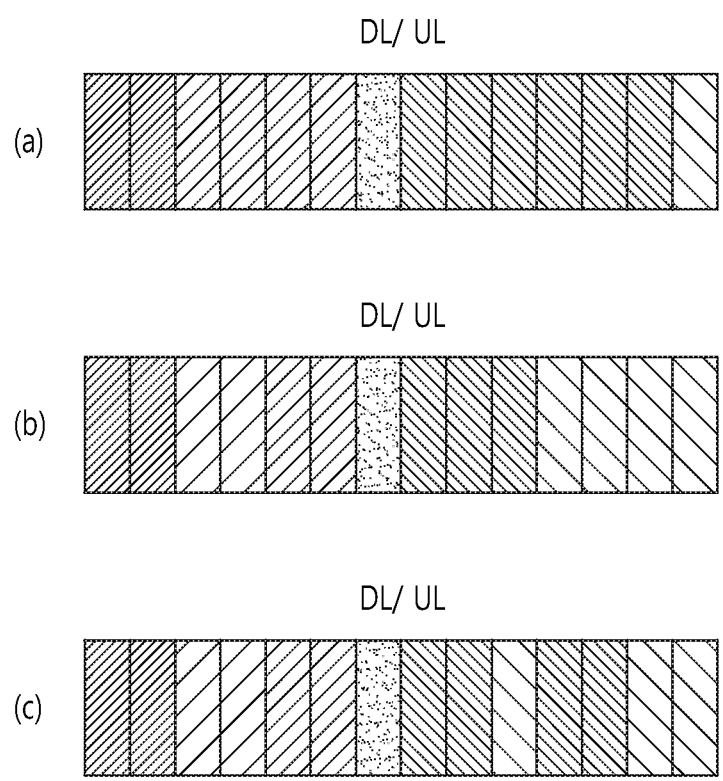
FIG. 12 shows another example of a frame structure for a new RAT according to an embodiment of the present invention.

FIG. 12 shows another example of a frame structure for a new RAT according to an embodiment of the present invention. If DL and UL portion is equal within one TTI, potentially limited number of levels may be supported for short TTIs. Referring to FIG. 12, only level 1, level 2, and level 3 are supported. FIG. 12-(a) corresponds to level 1, i.e. FS1. FIG. 12-(b) corresponds to level 2 of FS2, in which one short TTI consists of 6 OFDM symbols. 2 short TTIs are configured in one TTI of FS1. FIG. 12-(c) corresponds to level 3 of FS2. For level 3, short TTI size of 2 OFDM symbols may be considered (in total of 3 short TTIs per DL/UL) or 1/2/1/2 (or 2/1/2/1) short TTI lengths may be considered to support 4 short TTIs.

UL switching symbol may be placed in any OFDM symbol in subframe with DL transmission. In other words, gap for DL to UL switching may be placed in any OFDM symbol which will be used by UE for switching. From DL perspective, the gap and UL symbols may be rate matched or punctured. From UL perspective, the gap and DL symbols may be rate matched or punctured.

D. Frame Structure for eV2X in FDD

In this case, sharing among UEs transmitting towards the network needs to share UEs transmitting sidelink. The resource allocation mechanism or frame structure of eV2X UEs may be similar to other FS1 UEs. From a V2X UE perspective, if the same RF/baseband capability of DL is used for both reception from the network and reception from other UEs, it may be necessary to separate DL resources between two transmission types.

Similar mechanisms used in TDD case may be applied to FDD case as well, where sidelink resources may be configured in either DL or UL spectrum. The TTI length of sidelink may also be reduced to allow DL control reception and/or gap creation. Similar approach to place SL DL/UL control may be considered. In this case, if sidelink is only configured in UL spectrum, DL control may not be considered. If sidelink is configured in DL spectrum, UL control may not be considered. Alternatively, UL and DL spectrum may be used in a pair among different cells for different UEs. For example, a set of subframes may be fixed as DL or UL in each DL and UL spectrum. These configured subframes may not be configured as sidelink resources in either DL or UL spectrum. Other subframes in either DL or UL may be used for sidelink operation, like multi-carrier sidelink operation. Each UE may determine reception frequency and transmission frequency between DL and UL spectrum. Once it determines its direction, the UE will continue receiving or transmitting in one frequency and do opposite in the other frequency. In other words, other than fixed subframes, flexible subframes in either DL or UL may be used, like one carrier from a sidelink perspective similar to TDD case. More generally, TDD case may be applied in those flexible subframes, and DL carrier may include DL control in each TTI depending on configurations and UL carrier may include UL control in each TTI depending on configuration.

E. Frame Structure for eV2X in TDD

If TDD is used for eV2X, FS1 may be configured. Depending on its subframe type configuration of FS1, subset of UL portions may be used for sidelink operation (possibly except for UL control regions). Alternatively, a subset of subframes may be configured with subframe type, and the other subframes may be determined based on higher layer signaling and/or dynamic signaling. For example, non-DL subframe may be potentially allowed as sidelink capable subframes, then which subframes are usable for sidelink operation may be dynamically indicated by scheduling assignment (SA) transmission. In this case, to avoid any ambiguity, the SA may be transmitted in fixed UL subframe configured in MIB and/or SIB.

IF DL control is potentially used in flexible subframes (i.e. flexible subframe is a subframe without configured subframe type via MIB and/or SIB), it may be desirable to avoid use of potential DL control portion in sidelink operation to minimize interference to other UEs, and potentially allow listening on DL control by eV2X UEs. In this case, DL control and potentially a gap to switch from DL to UL may be assigned in every flexible subframe. Alternatively, a subset of subframes with DL control may also be preconfigured, and a UE may assume that the first one or a few OFDM symbols may not be used for sidelink transmission in such subframes. To align resources among different cells, cells may be coordinated including DL control portions. Or, simply one or a few first OFDM symbols may always not be used for sidelink transmission in every TTI.

Alternatively, subframe type for FS1 may be ignored and only sidelink resource information may be considered. For example, the network may perform FDM approaches between DL and UL between FS1 UEs receiving the data from the network and sidelink UEs.

Whether to reserve DL control and UL control may be determined by at least one of the following approaches.

- The network may configure the length of sidelink resource used in one TTI or the necessity of DL control and/or UL control region reservation. This may also allow flexible configuration of DL and UL control resource from network perspective. Only DL control portion may be reserved.
- The UE may determine whether to reserve DL control and UL control depending on communication/discovery type. If the network controlled communication/discovery is used, DL control may be reserved. Otherwise, full TTI may be used for sidelink transmission. The gap may be used between DL and UL direction to minimize interference.
- The resource may also include TTI size per each TTI in resource configuration.

It may be prefixed or follow a rule to determine the size.

When each cell uses dynamic subframe type, different interference may be expected depending on subframe type on sidelink resources. In this sense, a subset of default UL subframes may be configured, and at least control channels of sidelink (such as SA) may be transmitted in those UL subframes. Those fixed UL subframes may be aligned among neighbor cells to minimize the interference among cells (similar concept may also be applied to DL as well).

Also, ACK/NACK and control information for sidelink operations may be supported. Thus, sidelink DL control (configuration of sidelink resources, collision handling, etc., where all UEs except for the controlling UEs are supposed to listen) and ACK/NACK or feedback resource of sidelink (called sidelink UL control) should be placed somewhere. For this, at least one of the following options may be considered.

Option 1: Sidelink SL control may be multiplexed with DL/UL control by FDM (same direction): Or, the same OFDM symbol for DL control may be used for sidelink DL control and the same OFDM symbol for UL control may be used for sidelink UL control. It may follow the network configuration and the same configuration may be indicated to other UEs. This may be beneficial for relay nodes or UEs without network controlled operation. If this option is used, proper gap or interference mitigation between DL control and sidelink DL control may be assumed.

Option 2: Sidelink control FDM may be multiplexed with DL/UL control by FDM (opposite direction): Or, sidelink DL control may be placed in UL control region and sidelink UL control may be placed in SL DL control region to minimize the interference, assuming that interference from a UE to the network may be less significant to interference between UEs.

Option 3: Nested self-contained subframe

Figure 13:
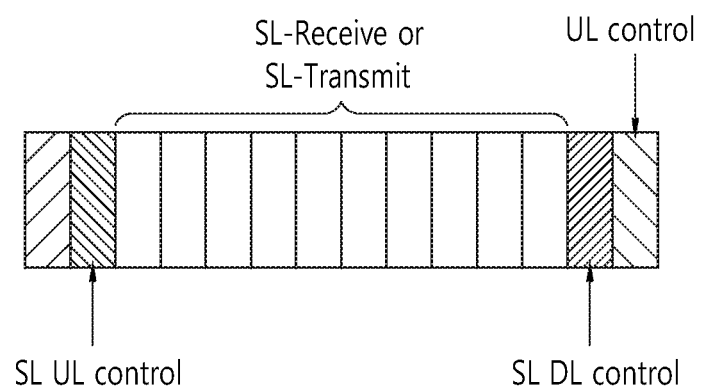
FIG. 13 shows an example of a nested self-contained subframe according to an embodiment of the present invention.

FIG. 13 shows an example of a nested self-contained subframe according to an embodiment of the present invention. Referring to FIG. 13, sidelink DL control and/or sidelink UL control may be placed only in resources configured for sidelink operation. Depending on UE capability, gap from sidelink DL control to sidelink-transmit may be necessary. Depending on UE timing advance (TA) and other UL timing, gap between sidelink DL-receive to sidelink UL control may also be necessary. To allow a gap, it may be generally desirable not to use the last OFDM symbol for sidelink. In this case, either sidelink UL control or sidelink DL control may be placed in the second next to the last OFDM symbol.

If the last OFDM symbol is used for UCI transmission toward to the network, it may not be used for the gap. To handle this case, a UE may create a gap by not receiving the next OFDM symbol if the next subframe is also used for sidelink. In this case, sidelink UL control may be omitted and a UE may not receive sidelink DL control. To avoid such a case, if there is possibility of UCI transmission in the last OFDM symbol, it may be desirable to add one additional gap in the first OFDM symbol of the TTI.

Overall, the followings may be considered for sidelink frame structure. TTI length of a sidelink may be at least 2*gap OFDM symbols smaller than TTI length of host frame structure (e.g. if the gap size is 1 OFDM symbol, 2 OFDM symbols smaller than the FS1). Further, sidelink DL control and sidelink UL control may be placed in next to DL control and UL control (after and before) in the same TTI. If the gap is necessary to switch from sidelink DL/UL control to DL/UL control, the following order of priorities, UL control, sidelink DL/UL control, and DL control, may be used. If there is no sufficient gap is created by dropping lower priority, the next lower priority channel may be dropped.

4. Additional Frame Structure Design for URLLC Considering U-Plane Latency

In the new RAT, scalable numerology may be considered. Some candidates of subcarrier spacing include 15 kHz, 30 kHz, 60 kHz, 120 kHz, etc. Among those, at least 15, 30, 60 kHz subcarrier spacing may be applied for under 6 GHz frequency band. Considering that the requirement of URLLC is 0.5 ms for U-plane latency, some consideration on frame structure may be necessary. To minimize the overall U-plane latency, UL subframe boundary may be shifted. Assuming that data at L2/L3 queue may be scheduled to the next available subframe, the average latency may be 0.5*TTI. Assuming that UL subframe boundary is shifted by decoding latency of data channel, the latency to get the data at L2 at the destination side (without considering HARQ process) may be around 2*TTI.

A. Frame Structure for URLLC in FDD

If HARQ process is considered, in FDD, since UL can be available anytime, the latency to encode ACK/NACK and TA may be added with HARQ retransmission latency. Overall, it may become 2.8*TTI (around 3*TTI).

Table 1 shows an example of numerologies for normal CP and extended CP with 30 kHz spacing.

TABLE 1

|  | eMBB - NCP | eMBB - ECP | URLLC - NCP | URLLC - ECP |
| --- | --- | --- | --- | --- |
| OFDM symbol | 33.34 | 33.34 | 33.34 | 33.34 |
| Number of OFDM symbols in a TTI | 14 | 12 | 4/3/4/3 in 0.5 ms | Option 1: 3 symbols Option 2: 4 symbols |
| TTI length | 0.5 ms | 0.5 ms | 0.1425/0.1075/ 0.1425/0.1075 ms | 0.125 (with Option 1) 0.16667 (with Option 2) |
| CP length | Half of LTE CP in NCP case | 8.33 us | Half of LTE CP in NCP case | 8.33 us |

Table 2 shows an example of numerologies for normal CP and extended CP with 15 kHz spacing.

TABLE 2

|  | eMBB - NCP | eMBB - ECP | URLLC - NCP | URLLC - ECP |
| --- | --- | --- | --- | --- |
| OFDM symbol | 66.67 us | 66.67 us | 66.67 us | 66.67 us |
| Number of OFDM symbols in a TTI | 14 | 12 | 2 | 2 symbols |
| TTI length | 1 ms | 1 ms | 0.143 ms | 0.1667 |
| CP length | Half of LTE CP in NCP case | Half of LTE CP in ECP case | Half of LTE CP in NCP case | Half of LTE CP in ECP case |

Table 3 shows an example of numerologies for normal CP and extended CP with 60 kHz spacing.

TABLE 3

|  | eMBB - NCP | eMBB - ECP | URLLC - NCP | URLLC - ECP |
|---|---|---|---|---|
| OFDM symbol | 16.67 us | 16.67 us | 16.67 us | 16.67 us |
| Number of OFDM symbols in a TTI | 14 | 10 (option 1) 12 (option 2) | 7 | 5 symbols (option 1) 6 symbols (option 2) |
| TTI length | 0.25 ms | 0.25 ms | 0.125 ms | 0.125 |
| CP length | Half of LTE CP in NCP case | 8.33 us (option 1) 4.16 us (option 2) | Half of LTE CP in NCP case | 8.33 us (option 1) 4.16 us (option 2) |

If 3 symbol short TTI is used (e.g. URLLC/30 kHz/option 2), one short TTI may cross the slot boundary of eMBB subframe if slot is defined. More generally, short TTI may be defined over one or multiple subframes. One example is to aggregate two subframes and divide two subframe into multiple short TTIs (e.g. with 14 OFDM symbols of eMBB subframe, 4 OFDM symbol*7 short TTIs may be constructed over two subframes for URLLC use case). In this case, where the short TTI starts (e.g. every even subframe or every odd subframe) needs to be clarified and may be defined in the specification or determined via initial access procedure.

B. Frame Structure for URLLC in TDD

In TDD, since the ACK/NACK timing may be dependent on the availability of UL, if there is unavailable UL, the latency may be increased. Thus, to support low latency, in every short TTI, it is expected to have UL portion which can be dynamically created, whenever there is UL transmission. In TDD, if UL subframe boundary is shifted, UL transmission may occur in the middle of subframe. This may be handled by the network if the network and/or UE support (semi) full duplex capability. Or, larger delay budget may be assumed for TDD (e.g. 2*TTI+TA without HARQ, 3*TTI with HARQ). In TDD, even without subframe offset, as DL portion is relatively smaller compared to FDD, overall decoding latency may also be reduced (which in turn may lead less peak data rate with low latency). For TDD, the similar TTI length and the number of OFDM symbol per TTI may be considered.

Figure 14:
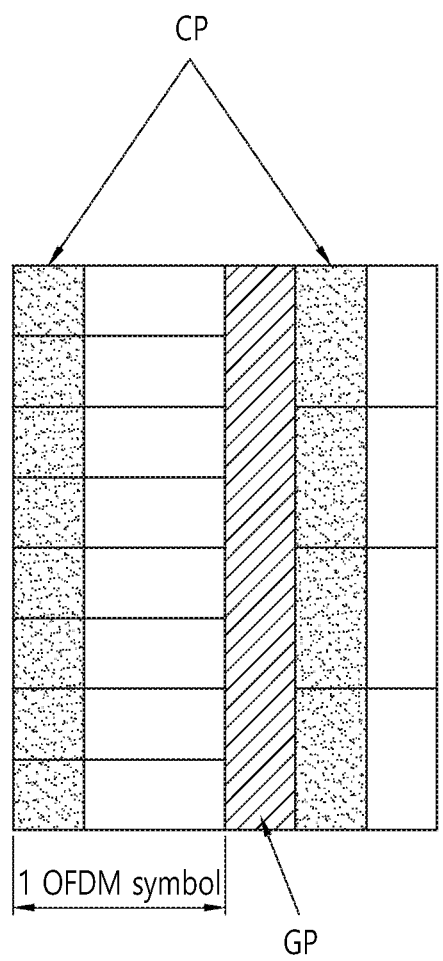
FIG. 14 shows another example of a frame structure for a new RAT according to an embodiment of the present invention.

FIG. 14 shows another example of a frame structure for a new RAT according to an embodiment of the present invention. In FIG. 14, 2 OFDM symbol length frame structure is supported in TDD. In order to support 2 OFDM symbol length with 15 kHz or other subcarrier spacing, one OFDM symbol may be assumed for DL portion, and double subcarrier spacing for uplink portion may be assumed (e.g. 30 kHz with 15 kHz DL subcarrier spacing) with keeping the same CP overhead for UL. The remaining part may be used for guard period (GP) including TA and DL/UL switching time.

Figure 15:
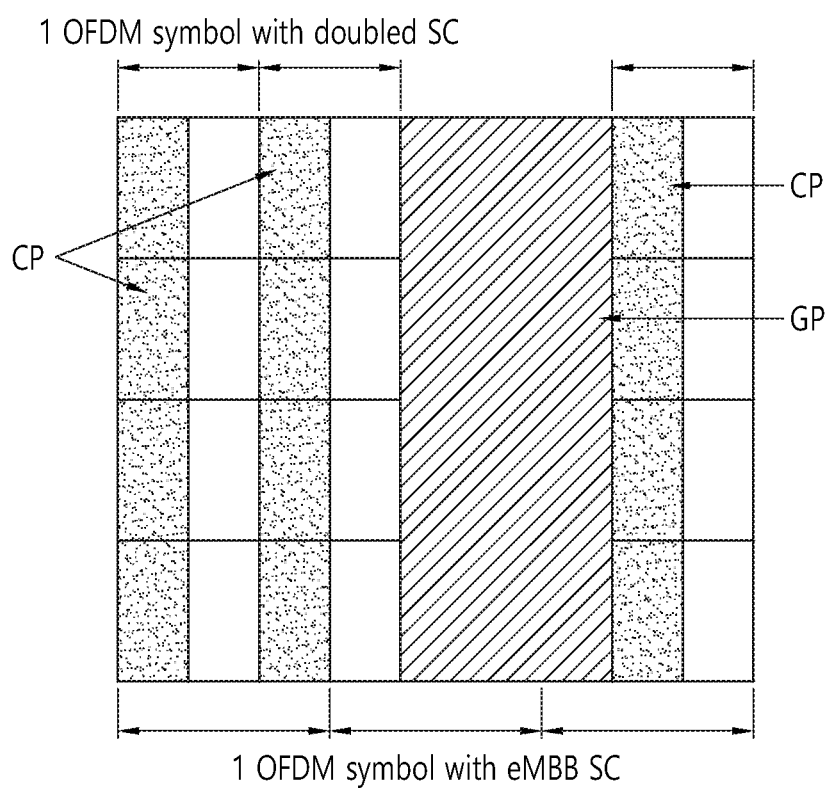
FIG. 15 shows another example of a frame structure for a new RAT according to an embodiment of the present invention.

FIG. 15 shows another example of a frame structure for a new RAT according to an embodiment of the present invention. In FIG. 15, 3 OFDM symbol length frame structure is supported in TDD.

For multiplexing of different use cases from the network perspective, different numerology or different subcarrier spacing may be used where the same CP may be still assumed between two different use cases. For this, 1 OFDM symbol for DL and 1 OFDM symbol for GP and 1 OFDM symbol for UL may be define in 3 OFDM symbol TTI length. Alternatively, similar to 2 OFDM symbol case, only UL portion may use different subcarrier spacing to allow more DL OFDM symbols available.

More generally, this approach may be explained that URLLC can be utilized with extended CP with larger subcarrier spacing compared to eMBB to maintain the same level of CP. The remaining time may be applied towards GP between UL/DL switching and TA. Having larger GP in URLLC, TDD may be beneficial to allow more decoding time and UL transmission preparation. This case may be beneficial to reserve more processing time or allow larger GP which may be beyond one OFDM symbol length in 3 OFDM symbol short TTI case in TDD.

Figure 16:
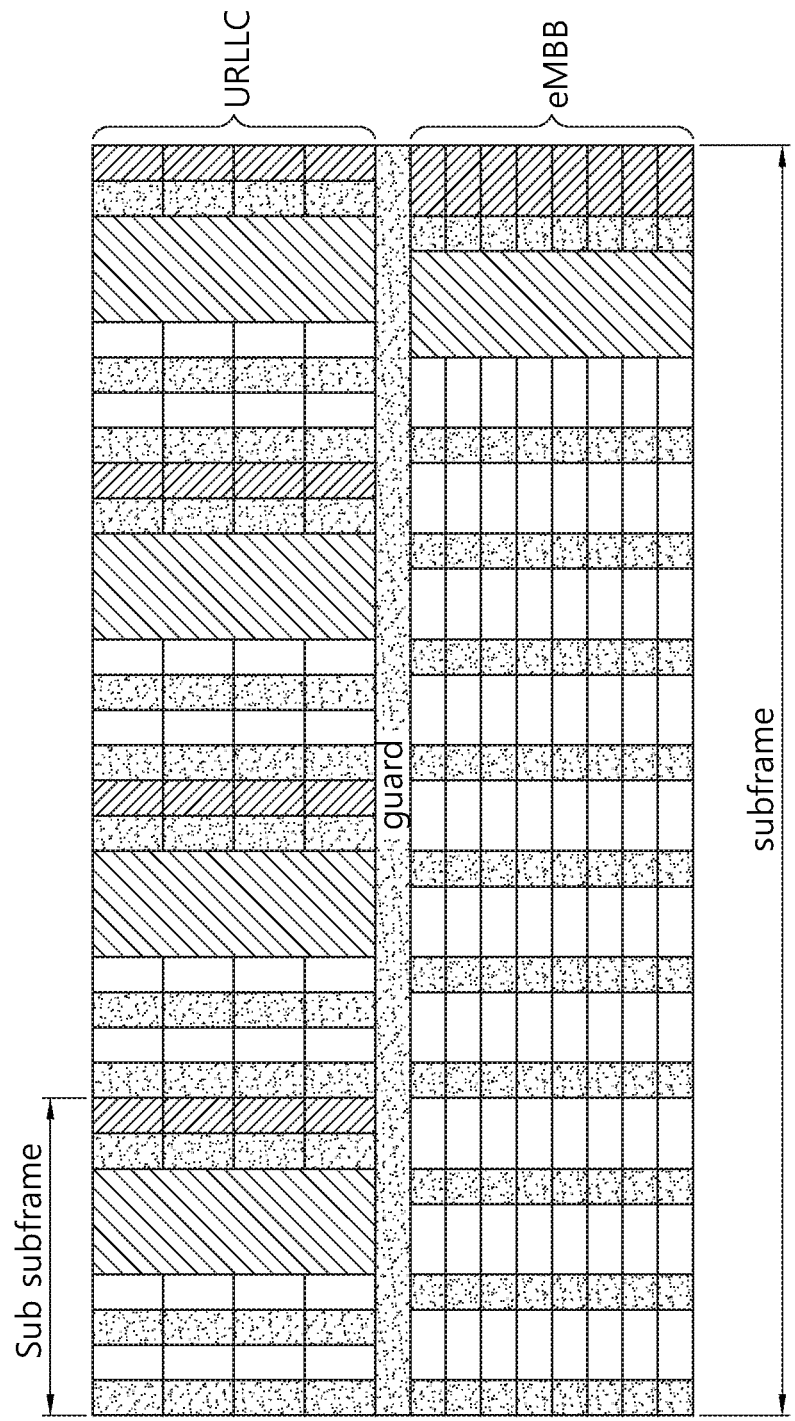
FIG. 16 shows an example of different subcarrier spacing between URLLC and eMBB which are multiplexed in a same carrier or frequency band.

FIG. 16 shows an example of different subcarrier spacing between URLLC and eMBB which are multiplexed in a same carrier or frequency band. From a UE perspective, each portion may be managed by individual transmission point or a cell such that initial access can be achieved separately per use cases. However, URLLC provided by shorter TTI with the same numerology with eMBB may also share the initial access procedure with host eMBB case. In this sense, via the initial access, whether to support short TTI or regular TTI may be informed.

In determining UL portion for short TTI for URLLC, the portion or the number of OFDM symbol for UL portion in each short TTI may also depend on the necessity of demodulation RS (DM-RS) transmission. For example, if a UE requires to transmit DM-RS at least in one subframe in every 7 OFDM symbol, short TTIs within 7 OFDM symbol may not need to transmit DM-RS multiple times. In this sense, the first short TTI in every 7 OFDM symbol may have at least two OFDM symbols for UL portion and the remaining short TTIs may have one OFDM symbol for UL portion. Accordingly, dynamic determination of UL portion size may be supported depending on the necessity of DM-RS transmission in a given short TTI or not. This may also impact the behavior of DL reception, where a UE may puncture or not receiving the last DL OFDM symbol to shift UL portion one symbol forward. This may be restricted in case of 3 OFDM symbol short TTI. In this case, alternative approach is to transmit GP and DM-RS in one OFDM symbol with different subcarrier spacing or by other means.

5. Above 6 GHz Frequency

The above description of the present invention may be applied for a frequency band below 6 GHz. The above description of the present invention may be applied for a frequency band above 6 GHz as well. In a frequency band above 6 GHz, analog beam may be used. In this case, the unit of beam switching may be used similar to one TTI mentioned for FS1 and FS2. However, the unit of beam switching for data transmission may be assumed for the unit size. For example, if beam switching occurs in every OFDM symbol for PSS/SSS or control channel transmission, whereas beam switching occurs only once per TTI for data transmission, the basic unit for beam switching may be 1 TTI. If beam switching for data transmission occurs in every ½ TTI, the basic unit for beam switching may be ½ TTI. When configuring sidelink resources, beam direction of each resource may be indicated such that UEs can communicate each other based on beam direction and based on each other's location information. The same size of subcarrier spacing among different applications may be used for frequencies above 6 GHz.

7. DM-RS Sharing

For PUSCH, depending on coverage level, the network may configure the number of TTIs used for PUSCH transmission. As DM-RS for one OFDM symbol TTI in UL is very challenging (similar issue may be in DL as well, yet the problem may become more significant in UL due to SC-FDM characteristic and PAPR issue), the TTI of UL can be represented a bit differently in consideration of potentially DM-RS sharing among different TTIs.

Figure 17:
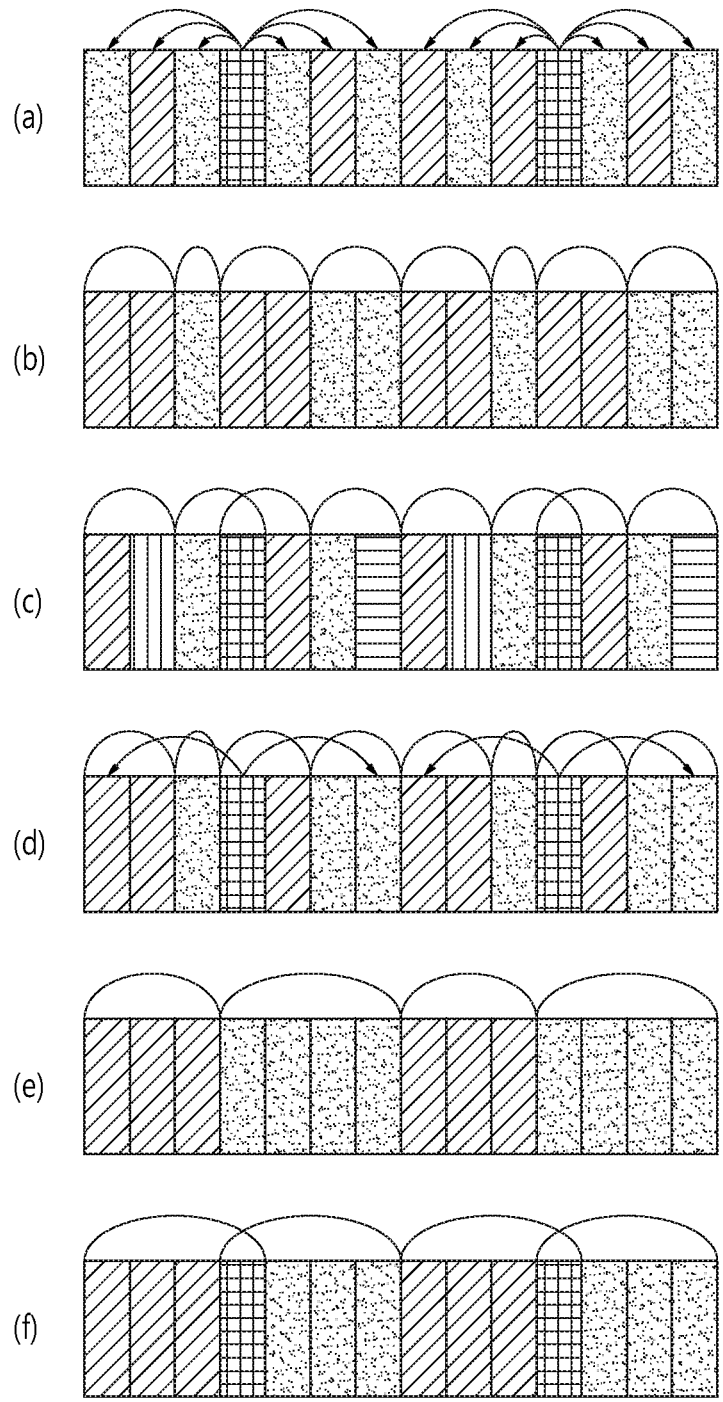
FIG. 17 shows an example of DM-RS sharing according to an embodiment of the present invention.

FIG. 17 shows an example of DM-RS sharing according to an embodiment of the present invention. FIG. 17-(a) shows a case of level 5 (i.e. 1 OFDM symbol short TTI) with discontinuous DM-RS. In this case, one symbol short TTIs share the DM-RS in the middle of legacy slot. Potentially different cyclic shift (CS) may be configured or preconfigured per each OFDM symbol to allow multiplexing of different TTIs. If a UE schedules more than one TTIs sharing the same DM-RS, it may continue using the first DM-RS scrambling/sequence of the first transmission among multiple TTIs. FIG. 17-(b) shows a case of level 4 (i.e. 2 OFDM symbols short TTI) with no DM-RS sharing.

FIG. 17-(c) shows a case of level 4 (i.e. 2 OFDM symbols short TTI) for physical sidelink shard channel (PSSCH) with DM-RS sharing. FIG. 17-(d) also shows a case of level 4 (i.e. 2 OFDM symbols short TTI) for PSSCH with DM-RS sharing. For Level 4 with DM-RS sharing, there may be two different approaches.

Approach 1: DM-RS sharing does not occur between adjacent short TTIs with 2 OFDM symbols, and DM-RS sharing occurs between short TTIs with 1 OFDM symbol and 2 OFDM symbols. This approach corresponds to FIG. 17-(c).

Approach 2: DM-RS sharing occurs over all TTIs similar to level 5. One DM-RS symbol is shared by multiple short TTIs. This corresponds to FIG. 17-(d). Similar level 5, CS may be predefined or configured per OFDM symbol, and the first OFDM symbol mapped scrambling/CS/sequence is used if the short TTI size is larger than 1.

FIG. 17-(e) shows a case of level 3 (i.e. 3/4 OFDM symbols short TTI) for physical uplink control channel (PUCCH) with no DM-RS sharing. FIG. 17-(f) shows a case of level 3 (i.e. 3/4 OFDM symbols short TTI) for PSSCH with DM-RS sharing. For level 3, if DM-RS sharing is considered, the fourth OFDM symbol in each slot may be used for DM-RS sharing.

Additional DM-RS within a short TTI may be added which may or may not be shared among different short TTIs. For example, if PUCCH transmission is considered, with DM-RS sharing, additional DM-RS (the same DM-RS or with different CS) may be used in each TTI as well.

Figure 18:
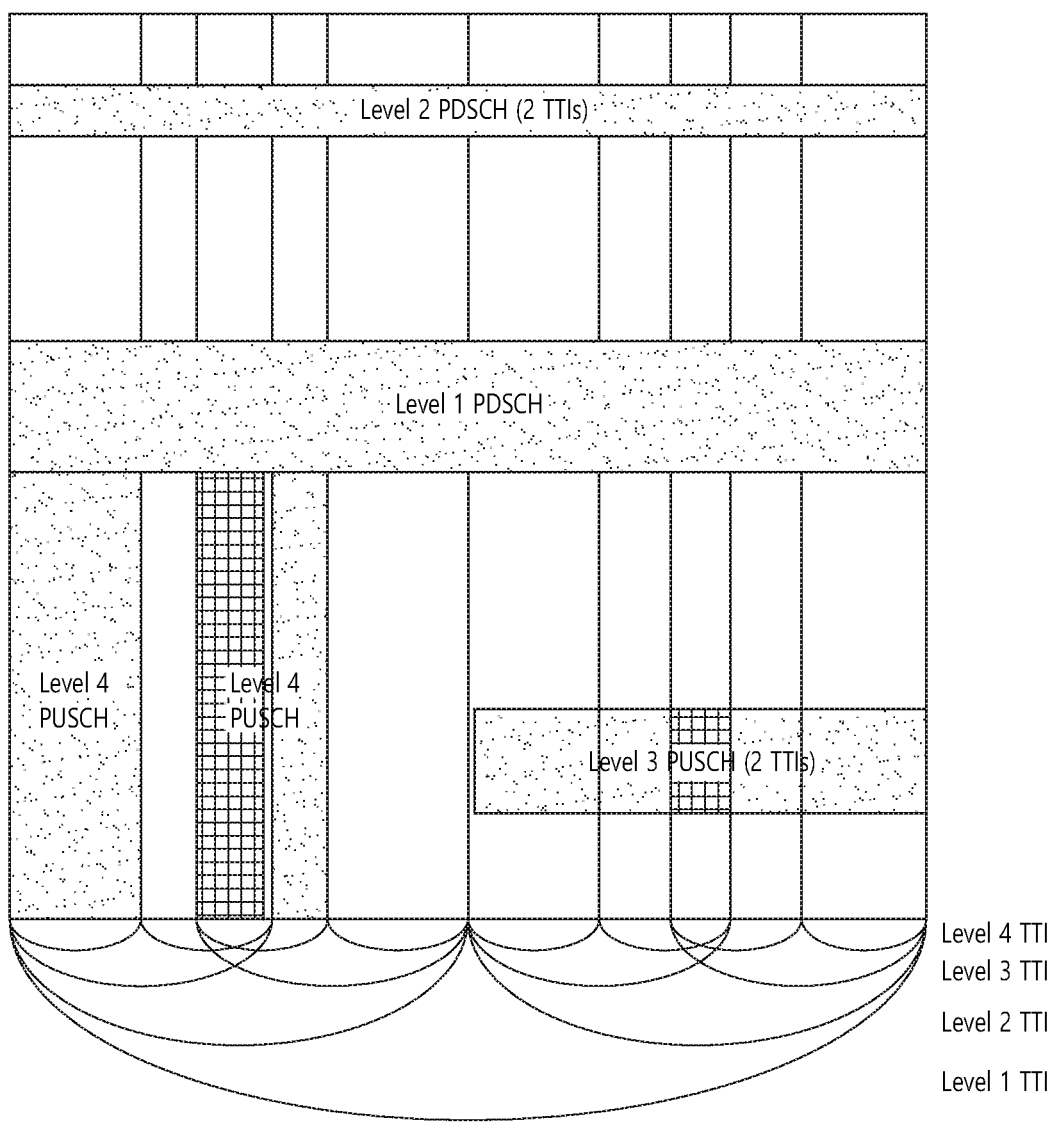
FIG. 18 shows an example of PUSCH scheduling with DM-RS sharing according to an embodiment of the present invention.

FIG. 18 shows an example of PUSCH scheduling with DM-RS sharing according to an embodiment of the present invention. Referring to FIG. 18, PUSCHs of level 4 share DM-RS, and PUSCHs of level 3 with 2 short TTIs may also share DM-RS.

Figure 19:
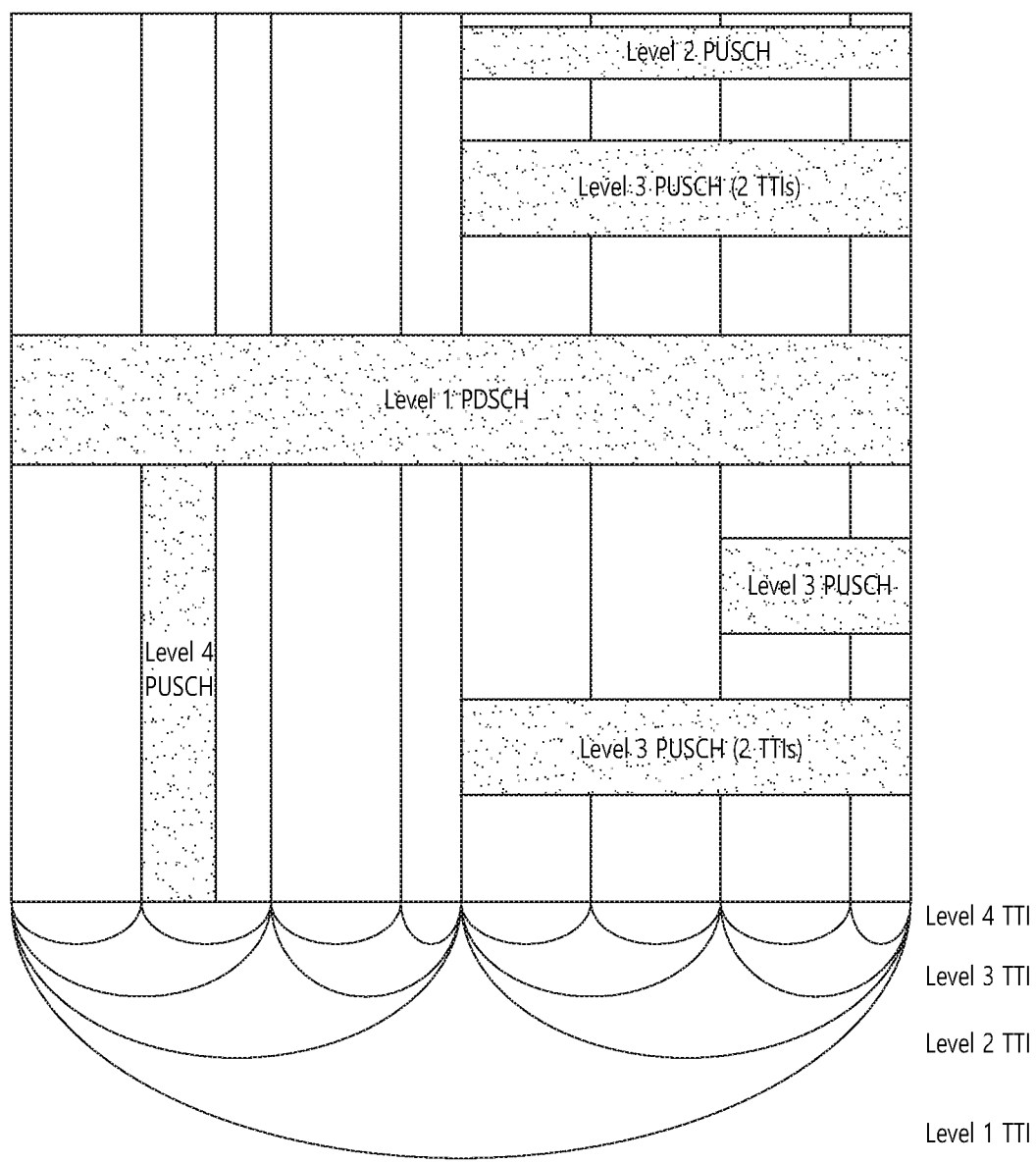
FIG. 19 shows an example of PUCCH scheduling without DM-RS sharing according to an embodiment of the present invention.

FIG. 19 shows an example of PUCCH scheduling without DM-RS sharing according to an embodiment of the present invention. Referring to FIG. 19, there is no DM-RS sharing.

8. ACK/NACK Transmission

For ACK/NACK transmission or UCI transmission via PUCCH, the network may also indicate the number of TTIs used for ACK/NACK transmission or PUCCH transmission via DCI or higher layer signaling. As the coverage of ACK/NACK transmission may also be dependent on the number of ACK/NACK bits or UCI bits, it may be dynamically indicated by DL grant. For example, the timing and frequency offset of ACK/NACK transmission, and also the number of TTIs used for ACK/NACK transmission may be configured in DL grant. Or, the length may be determined by the number of UCI bits. The number of TTIs used for PUCCH may be semi-statically configured. In terms of baseline timing of ACK/NACK, (sPDSCH transmission duration+sPDSCH transmission duration (for decoding) or higher layer configured decoding latency+2*sTTI for UL for ACK/NACK preparation) may be assumed. If there is offset configured in the DL grant, the offset may be added to the baseline timing of ACK/NACK.

9. Short TTI Indexing

To indicate a short TTI within the largest TTI, assuming the largest TTI uses the subframe index, separate indexing of short TTI may be considered. In one subframe, K maximum short TTI may be placed. In terms of configuration of e.g. semi-persistent scheduling (SPS), CSI, etc., or any periodic configuration, periodicity may be represented by TTI length or multiple of TTIs. The periodicity may start from SFN=0 and subframe index=0. Alternatively, periodicity may be represented in two level, i.e. periodicity in subframes and periodicity within a subframe.

10. Short TTI Length for Each Channel

There are a couple of aspects to determine right shot TTI length for each channel, e.g. the file size, system resource utilization, UE geometry, etc. Overall, smaller file size in a lighted loaded scenario for good coverage UEs may lead best performance gain, whereas very little or even worse performance may be expected with short TTI for poor coverage UEs with large file sizes. In this sense, it seems considerable to apply UE-specific TTI length at least based on UE geometry. However, the file size also impacts on the overall performance gain due to the associated protocol overhead and control overhead. In this sense, mechanisms to allow dynamic change of sPDSCH/sPUSCH may be beneficial to address the case where a UE has multiple transmission control protocol (TCP) sessions with different file sizes. As packets from different TCP sessions are not differentiable from the physical layer perspective, it may be beneficial to consider dynamic TTI length adaptation via DCI.

To support this, the following overall approaches may be considered.

(1) Dynamic TTI length for all channels: The TTI length of sPDCCH may be dynamically changed which are blindly monitored by a UE. Based on the scheduled sPDCCH, the UE may determine the TTI length for sPDSCH/sPUSCH. This approach however requires some mechanism to identify the length of sPDCCH. One approach is to assume that FDM between sPDCCH and sPDSCH is used such that sPDCCH is transmitted always over the entire short TTI. Or, explicit indication in DCI may be necessary.

(2) Fixed TTI length for sPDCCH with dynamic indication via DCI: Alternatively, the TTI length used for sPDCCH may be higher layer configured, and the TTI length of scheduled sPDSCH or sPUSCH may be dynamically adapted by the signaling in DCI.

The first approach may offer benefits to adapt sPDCCH resource in time domain (if sPDCCH and sPDSCH is multiplexed partially or fully by FDM). This however may be also achieved by different aggregation levels. Furthermore, it seems that both approaches may require potentially explicit indication via DCI. Thus, the clear benefits of the first approach while it restricts the flexibility are not clear. In this sense, to simplify the UE blind decoding, refer the second approach may be preferred. In other words, supporting different TTI length for data channel may be supported by a multiple TTI scheduling manner.

When variable/multi-TTI length scheduling is supported, the issue with multiplexing between sPDSCH with different TTI lengths may be also considered in terms of processing latency For example, if decoding latency is same as the length of sPDSCH, if longer TTI scheduling occurs before shorter TTI scheduling happens, the decoding or processing of following shorter TTI can be delayed (unless pre-emption is assumed). Thus, depending on the scheduling, the overall latency till ACK/NACK transmission can be changed. To address different cases, asynchronous HARQ-ACK feedback timing for sPDSCH may be considered as well where ACK/NCK timing can be signaled via DL scheduling DCI. Further, the shorter TTI of PUCCH transmission may reduce the overall coverage. This may be all right for good coverage UEs whereas it may impact on the cell edge UEs. In this sense, the TTI length for sPUCCH transmission may be semi-statically configured. Based on the semi-statically configured TTI length for sPDCCH and sPUCCH, timing of DL and UL may be respectively determined which are used for resources for DL and UL transmissions.

Figure 20:
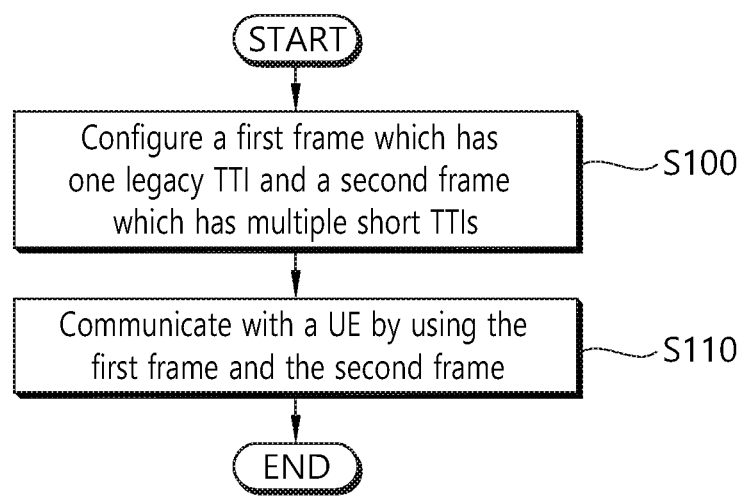
FIG. 20 shows a method for configuring a frame structure for a new RAT by a network node according to an embodiment of the present invention.

FIG. 20 shows a method for configuring a frame structure for a new RAT by a network node according to an embodiment of the present invention. The present invention described above may be applied to this embodiment.

In step S100, the network node configures a first frame which has one legacy TTI and a second frame which has multiple short TTIs. In step S110, the network node communicates with a UE by using at least one of the first frame and the second frame.

The second frame may have the nested frame structure described above. The second frame may contain different number of short TTIs per a number of symbols in each short TTI. The number of symbols in each short TTI may be identical. In this case, at least one symbol may be shared between adjacent short TTIs.

The second frame may contain at least one of a symbol for DL control, a symbol for UL control, a symbol for a sidelink DL control or a symbol for a sidelink UL control. The symbol for DL control may be placed in a first symbol of the second frame, and the symbol for UL control may be placed in a last symbol of the second frame. The symbol for sidelink DL control may be placed in a second last symbol of the second frame, and the symbol for sidelink UL control may be placed in a second symbol of the second frame. Further, a gap may be configured between the symbol for DL control and the symbol for sidelink UL control, or between the symbol for sidelink DL control and the symbol for UL control.

A synchronization signal may be transmitted in a minimum system bandwidth with minimum density in the second frame. The synchronization signal may be shared among the first frame and the second frame. The synchronization signal may be repeated in a frequency domain or a time domain.

The first frame and the second frame may be configured according to one of different baseband bandwidth capability, different processing capability, different number of possible UEs accessing a cell, different synchronization requirement, different subcarrier spacing or different coverage requirement. The UE may be a one of an mMTC UE, a URLL) UE or an eV2X UE.

Figure 21:
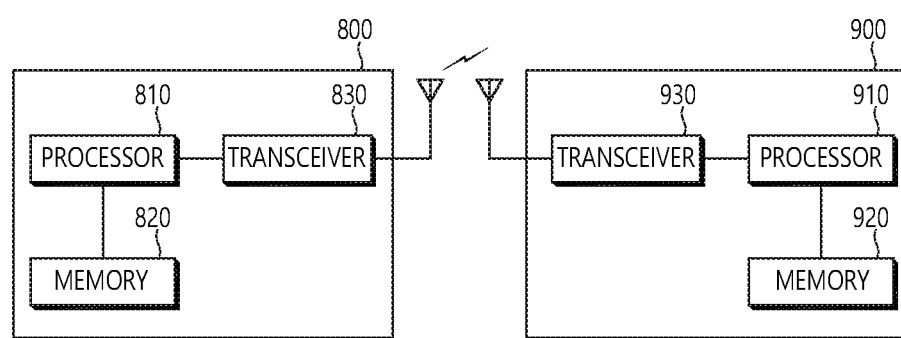
FIG. 21 shows a wireless communication system to implement an embodiment of the present invention.

FIG. 21 shows a wireless communication system to implement an embodiment of the present invention.

A network node 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for configuring a frame structure by a network node in a wireless communication system, the method comprising:
configuring a first frame which has one legacy transmission time interval (TTI) and a second frame which has multiple short TTIs; and communicating with a user equipment (UE) by using at least one of the first frame or the second frame,
wherein the second frame contains at least one of a symbol for downlink (DL) control, a symbol for uplink (UL) control, a symbol for sidelink DL control or a symbol for sidelink UL control,
wherein the symbol for sidelink DL control is placed in a second last symbol of the second frame, and
wherein the symbol for sidelink UL control is placed in a second symbol of the second frame.

2. The method of claim 1, wherein the second frame contains different number of short TTIs per a number of symbols in each short TTI.

3. The method of claim 2, wherein the number of symbols in each short TTI is identical.

4. The method of claim 3, wherein at least one symbol is shared between adjacent short TTIs.

5. The method of claim 1, wherein the symbol for DL control is placed in a first symbol of the second frame, and
wherein the symbol for UL control is placed in a last symbol of the second frame.

6. The method of claim 1, wherein a gap is configured between the symbol for DL control and the symbol for sidelink UL control, or between the symbol for sidelink DL control and the symbol for UL control.

7. The method of claim 1, wherein a synchronization signal is transmitted in a minimum system bandwidth with minimum density in the second frame.

8. The method of claim 7, wherein the synchronization signal is shared among the first frame and the second frame.

9. The method of claim 7, wherein the synchronization signal is repeated in a frequency domain or a time domain.

10. The method of claim 1, wherein the first frame and the second frame are configured according to one of different baseband bandwidth capability, different processing capability, different number of possible UEs accessing a cell, different synchronization requirement, different subcarrier spacing or different coverage requirement.

11. The method of claim 1, wherein the UE is a one of a massive machine-type communication (mMTC) UE, an ultra-reliable and low latency communication (URLLC) UE or an enhanced vehicle-to-everything (eV2X) UE.

12. A network node in a wireless communication system, the network node comprising:
a memory;
a transceiver; and
a processor, coupled to the memory and the transceiver, that:
configures a first frame which has one legacy transmission time interval (TTI) and a second frame which has multiple short TTIs, and
controls the transceiver to communicate with a user equipment (UE) by using at least one of the first frame or the second frame,
wherein the second frame contains at least one of a symbol for downlink (DL) control, a symbol for uplink (UL) control, a symbol for sidelink DL control or a symbol for sidelink UL control,
wherein the symbol for sidelink DL control is placed in a second last symbol of the second frame, and
wherein the symbol for sidelink UL control is placed in a second symbol of the second frame.

* * * * *